(12) United States Patent
Temple, Jr.

(10) Patent No.: US 9,114,902 B2
(45) Date of Patent: Aug. 25, 2015

(54) METHODS AND SYSTEMS FOR USE IN FORMING AN ARTICLE FROM A MULTI-LAYER SHEET STRUCTURE

(75) Inventor: Loren F. Temple, Jr., Muncie, IN (US)

(73) Assignee: Polyone Designed Structures and Solutions LLC, Avon Lake, OH (US)

( * ) Notice: Subject to any disclaimer, the term of this patent is extended or adjusted under 35 U.S.C. 154(b) by 274 days.

(21) Appl. No.: 13/223,412

(22) Filed: Sep. 1, 2011

(65) Prior Publication Data

US 2012/0242012 A1   Sep. 27, 2012

Related U.S. Application Data

(60) Provisional application No. 61/466,326, filed on Mar. 22, 2011.

(51) Int. Cl.
| | |
|---|---|
| B29C 51/10 | (2006.01) |
| B65D 1/26 | (2006.01) |
| B65D 1/28 | (2006.01) |
| B65D 21/02 | (2006.01) |
| B29C 51/04 | (2006.01) |
| B29C 51/14 | (2006.01) |
| B32B 7/12 | (2006.01) |
| B32B 27/08 | (2006.01) |
| B32B 27/20 | (2006.01) |

(Continued)

(52) U.S. Cl.
CPC .................. *B65D 1/265* (2013.01); *B29C 51/04* (2013.01); *B29C 51/14* (2013.01); *B32B 1/08* (2013.01); *B32B 7/12* (2013.01); *B32B 27/08* (2013.01); *B32B 27/20* (2013.01); *B32B 27/32* (2013.01); *B32B 27/36* (2013.01); *B32B 27/365* (2013.01); *B65D 1/28* (2013.01); *B65D 21/0233* (2013.01); *B29C 2791/006* (2013.01); *B29C 2791/007* (2013.01); *B32B 2272/00* (2013.01); *B32B 2307/306* (2013.01); *B32B 2307/558* (2013.01); *B32B 2439/00* (2013.01); *Y10T 428/3175* (2015.04); *Y10T 428/31504* (2015.04); *Y10T 428/31855* (2015.04); *Y10T 428/31909* (2015.04); *Y10T 428/31913* (2015.04)

(58) Field of Classification Search
None
See application file for complete search history.

(56) References Cited

U.S. PATENT DOCUMENTS

| | | | |
|---|---|---|---|
| 3,746,171 | A | 7/1973 | Thomsen |
| 3,823,656 | A | 7/1974 | Vander Veken |

(Continued)

FOREIGN PATENT DOCUMENTS

WO   2011061126 A2   5/2011

OTHER PUBLICATIONS

Notification of Transmittal of the International Search Report and the Written Opinion of the International Searching Authority for Int. Appln. No. PCT/US 12/29785, mailed Aug. 24, 2012.

(Continued)

*Primary Examiner* — Monica Huson
(74) *Attorney, Agent, or Firm* — Armstrong Teasdale, LLP

(57) ABSTRACT

A mold includes a forming insert that includes an upper portion and a lower portion. The upper portion includes a sidewall segment and a heel segment extending from a bottom of the sidewall segment. The sidewall segment has a sidewall radius, and the heel segment has a heel radius that is less than the sidewall radius. The lower portion extends axially downward from the upper portion to define a base cavity. A forming base is positionable within the base cavity. The rim has a rim radius that is less than the heel radius and the step has a step radius that is less than the rim radius.

21 Claims, 24 Drawing Sheets

(51) Int. Cl.
  *B32B 27/32*   (2006.01)
  *B32B 27/36*   (2006.01)
  *B32B 1/08*    (2006.01)

(56) References Cited

U.S. PATENT DOCUMENTS

| | | | |
|---|---|---|---|
| 3,844,206 A | 10/1974 | Weber | |
| 3,893,882 A * | 7/1975 | Repenning | 156/287 |
| 3,975,996 A | 8/1976 | Vitous | |
| 4,077,876 A | 3/1978 | Southall | |
| 4,545,296 A | 10/1985 | Ben-Shmuel | |
| 4,550,024 A | 10/1985 | le Granse | |
| 4,600,227 A | 7/1986 | Ennis et al. | |
| 4,629,596 A | 12/1986 | Coffman | |
| 4,829,889 A | 5/1989 | Takeuchi et al. | |
| 4,860,645 A | 8/1989 | van der Lijn et al. | |
| 4,894,291 A | 1/1990 | Ofstein | |
| 4,921,712 A | 5/1990 | Malmquist | |
| 4,995,310 A | 2/1991 | van der Lijn et al. | |
| 4,995,978 A | 2/1991 | Van de Gang | |
| 4,996,066 A | 2/1991 | Love et al. | |
| 5,008,013 A | 4/1991 | Favre et al. | |
| 5,082,676 A | 1/1992 | Love et al. | |
| 5,108,768 A | 4/1992 | So | |
| 5,178,058 A | 1/1993 | van Dort et al. | |
| 5,190,652 A | 3/1993 | van Thoor et al. | |
| 5,197,374 A | 3/1993 | Fond | |
| 5,242,702 A | 9/1993 | Fond | |
| 5,325,765 A | 7/1994 | Sylvan et al. | |
| 5,342,518 A | 8/1994 | Posner et al. | |
| 5,343,799 A | 9/1994 | Fond | |
| 5,424,083 A | 6/1995 | Lozito | |
| 5,454,293 A | 10/1995 | Santi | |
| 5,590,581 A | 1/1997 | Strub et al. | |
| 5,603,254 A | 2/1997 | Fond et al. | |
| 5,651,887 A | 7/1997 | Posner et al. | |
| 5,656,311 A | 8/1997 | Fond | |
| 5,738,786 A | 4/1998 | Winnington-Ingram | |
| 5,816,135 A | 10/1998 | Ferri | |
| 5,840,189 A | 11/1998 | Sylvan et al. | |
| D408,679 S | 4/1999 | Potts et al. | |
| 5,916,672 A | 6/1999 | Reeves et al. | |
| 5,924,563 A | 7/1999 | Salyers | |
| 5,937,737 A | 8/1999 | Karell | |
| 6,079,315 A | 6/2000 | Beaulieu et al. | |
| 6,082,247 A | 7/2000 | Beaulicu | |
| 6,142,063 A | 11/2000 | Beaulieu et al. | |
| D434,941 S | 12/2000 | Springfield | |
| 6,158,328 A | 12/2000 | Cai | |
| 6,182,554 B1 | 2/2001 | Beaulieu et al. | |
| 6,186,051 B1 | 2/2001 | Aarts | |
| 6,189,438 B1 | 2/2001 | Bielfeldt et al. | |
| 6,202,541 B1 | 3/2001 | Cai | |
| 6,245,371 B1 | 6/2001 | Gutwein et al. | |
| D452,433 S | 12/2001 | Lazaris | |
| D452,434 S | 12/2001 | Sweeney | |
| 6,383,375 B1 | 5/2002 | Zucholl | |
| 6,440,256 B1 | 8/2002 | Gordon et al. | |
| D462,865 S | 9/2002 | Honan et al. | |
| 6,465,028 B2 | 10/2002 | Gutwein et al. | |
| 6,517,878 B2 | 2/2003 | Heczko | |
| 6,520,070 B1 | 2/2003 | Heczko | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,622,615 B2 | 9/2003 | Heczko | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| 6,711,987 B2 | 3/2004 | Yoakim et al. | |
| 6,726,947 B1 | 4/2004 | Gutwein et al. | |
| D489,215 S | 5/2004 | Honan et al. | |
| 6,740,345 B2 | 5/2004 | Cai | |
| 6,758,130 B2 | 7/2004 | Sargent et al. | |
| 6,759,072 B1 | 7/2004 | Gutwein et al. | |
| 6,773,820 B1 | 8/2004 | Wilhoit et al. | |
| 6,777,007 B2 | 8/2004 | Cai | |
| 6,786,134 B2 | 9/2004 | Green | |
| 6,786,136 B2 | 9/2004 | Cirigliano et al. | |
| 6,808,731 B1 | 10/2004 | Gutwein et al. | |
| 6,810,788 B2 | 11/2004 | Hale | |
| 6,840,158 B2 | 1/2005 | Cai | |
| 6,843,165 B2 | 1/2005 | Stoner | |
| D502,362 S | 3/2005 | Lazaris et al. | |
| D506,926 S | 7/2005 | Halliday et al. | |
| 6,948,420 B2 | 9/2005 | Kirschner et al. | |
| 6,955,116 B2 | 10/2005 | Hale | |
| D513,572 S | 1/2006 | Schaffeld et al. | |
| 6,990,891 B2 | 1/2006 | Tebo, Jr. | |
| 6,994,879 B2 | 2/2006 | Cirigliano et al. | |
| 7,017,472 B2 | 3/2006 | Grant et al. | |
| 7,024,983 B2 | 4/2006 | Grant et al. | |
| 7,029,734 B1 | 4/2006 | Wuest | |
| 7,063,238 B2 | 6/2006 | Hale | |
| 7,081,263 B2 | 7/2006 | Albrecht | |
| 7,093,530 B2 | 8/2006 | Meister et al. | |
| 7,093,533 B2 | 8/2006 | Tebo, Jr. et al. | |
| 7,097,074 B2 | 8/2006 | Halliday et al. | |
| 7,165,488 B2 | 1/2007 | Bragg et al. | |
| D542,088 S | 5/2007 | Albrecht | |
| 7,213,506 B2 | 5/2007 | Halliday et al. | |
| 7,219,596 B2 | 5/2007 | Kief, Jr. | |
| 7,219,598 B2 | 5/2007 | Halliday et al. | |
| D544,299 S | 6/2007 | Schaffeld et al. | |
| 7,226,628 B2 | 6/2007 | Cai | |
| 7,231,869 B2 | 6/2007 | Halliday et al. | |
| 7,243,598 B2 | 7/2007 | Halliday et al. | |
| 7,255,039 B2 | 8/2007 | Halliday et al. | |
| 7,279,206 B2 | 10/2007 | Schell et al. | |
| 7,287,461 B2 | 10/2007 | Halliday et al. | |
| 7,294,266 B2 | 11/2007 | Vetterli | |
| 7,308,851 B2 | 12/2007 | Halliday | |
| D560,430 S | 1/2008 | Albrecht | |
| 7,316,178 B2 | 1/2008 | Halliday et al. | |
| 7,318,372 B2 | 1/2008 | Cooke | |
| 7,318,374 B2 | 1/2008 | Guerrero | |
| 7,320,274 B2 | 1/2008 | Castellani | |
| 7,322,277 B2 | 1/2008 | Halliday et al. | |
| 7,328,651 B2 | 2/2008 | Halliday et al. | |
| 7,340,990 B2 | 3/2008 | Halliday et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,418,899 B2 | 9/2008 | Halliday et al. | |
| 7,419,692 B1 | 9/2008 | Kalenian | |
| 7,438,941 B2 | 10/2008 | Gutwein et al. | |
| 7,455,867 B1 | 11/2008 | Gutwein et al. | |
| 7,461,587 B2 | 12/2008 | Guerrero | |
| 7,469,628 B2 | 12/2008 | Mandralis et al. | |
| 7,490,542 B2 | 2/2009 | Macchi et al. | |
| 7,504,142 B2 | 3/2009 | Harvey | |
| 7,513,192 B2 | 4/2009 | Sullivan et al. | |
| 7,523,695 B2 | 4/2009 | Streeter et al. | |
| 7,531,198 B2 | 5/2009 | Cortese | |
| 7,533,603 B2 | 5/2009 | Halliday et al. | |
| 7,533,604 B2 | 5/2009 | Halliday et al. | |
| 7,540,232 B2 | 6/2009 | Bates et al. | |
| 7,543,527 B2 | 6/2009 | Schmed | |
| 7,552,672 B2 | 6/2009 | Schmed | |
| 7,592,027 B2 | 9/2009 | Halliday et al. | |
| 7,594,470 B2 | 9/2009 | Scarchilli et al. | |
| 7,594,525 B2 | 9/2009 | Girard et al. | |
| 7,607,385 B2 | 10/2009 | Halliday et al. | |
| 7,614,524 B2 | 11/2009 | Girard et al. | |
| D606,363 S | 12/2009 | Aardenburg | |
| 7,640,843 B2 | 1/2010 | Halliday et al. | |
| 7,640,845 B2 | 1/2010 | Woodnorth et al. | |
| 7,644,653 B2 | 1/2010 | Bates | |

(56) References Cited

U.S. PATENT DOCUMENTS

| | | |
|---|---|---|
| D609,051 S | 2/2010 | Hofer |
| 7,654,991 B2 | 2/2010 | Stellbrink et al. |
| 7,658,840 B2 | 2/2010 | Lisenko |
| 7,669,518 B2 | 3/2010 | Bardazzi |
| 7,673,558 B2 | 3/2010 | Panesar et al. |
| 7,685,931 B2 | 3/2010 | Rivera |
| 7,685,932 B2 | 3/2010 | Rahn et al. |
| 7,703,381 B2 | 4/2010 | Liverani et al. |
| D621,698 S | 8/2010 | Cometto |
| 7,770,512 B2 | 8/2010 | Albrecht |
| 7,828,020 B2 | 11/2010 | Girard et al. |
| 7,829,120 B2 | 11/2010 | Gervais et al. |
| 7,832,328 B2 | 11/2010 | Koeling et al. |
| 7,845,270 B2 | 12/2010 | Rahn et al. |
| 7,856,920 B2 | 12/2010 | Schmed et al. |
| 7,866,255 B1 | 1/2011 | Wroblewski et al. |
| 7,891,286 B2 | 2/2011 | Scarchilli et al. |
| 7,921,766 B2 | 4/2011 | Halliday et al. |
| 7,963,213 B1 | 6/2011 | Murdock |
| 7,984,845 B2 | 7/2011 | Kelly |
| 7,987,767 B2 | 8/2011 | Hester et al. |
| 7,989,015 B2 | 8/2011 | Akashe et al. |
| 7,997,187 B2 | 8/2011 | Garman et al. |
| 8,005,740 B2 | 8/2011 | Arnott et al. |
| 8,017,409 B2 | 9/2011 | Tokhtuev et al. |
| 8,032,420 B2 | 10/2011 | Dziaba et al. |
| 8,033,211 B2 | 10/2011 | Halliday et al. |
| 8,039,029 B2 | 10/2011 | Ozanne |
| 8,039,034 B2 | 10/2011 | Ozanne |
| 2001/0041245 A1 | 11/2001 | Funakoshi |
| 2004/0060642 A1 | 4/2004 | Inaba et al. |
| 2005/0034604 A1 | 2/2005 | Halliday et al. |
| 2005/0095158 A1 | 5/2005 | Kirschner et al. |
| 2005/0166763 A1 | 8/2005 | Scarchilli et al. |
| 2005/0183581 A1 | 8/2005 | Kirschner et al. |
| 2005/0188854 A1 | 9/2005 | Green et al. |
| 2005/0241489 A1 | 11/2005 | Kirschner et al. |
| 2005/0287251 A1 | 12/2005 | Lazaris et al. |
| 2006/0065992 A1 | 3/2006 | Hutchinson et al. |
| 2006/0174773 A1 | 8/2006 | Taylor |
| 2006/0196364 A1 | 9/2006 | Kirschner |
| 2006/0288776 A1 | 12/2006 | Pelovitz |
| 2006/0288777 A1 | 12/2006 | Lazaris |
| 2006/0288875 A1 | 12/2006 | Kirschner et al. |
| 2006/0292012 A1 | 12/2006 | Brudevold et al. |
| 2007/0034086 A1 | 2/2007 | Colman et al. |
| 2007/0034087 A1 | 2/2007 | Colman et al. |
| 2007/0034089 A1 | 2/2007 | Colman et al. |
| 2007/0039479 A1 | 2/2007 | Dalton et al. |
| 2007/0044665 A1 | 3/2007 | Kirschner et al. |
| 2007/0051836 A1 | 3/2007 | Kirschner et al. |
| 2007/0056994 A1 | 3/2007 | Woodnorth et al. |
| 2007/0157821 A1 | 7/2007 | Panesar et al. |
| 2007/0163446 A1 | 7/2007 | Halliday et al. |
| 2007/0181005 A1 | 8/2007 | Kirschner et al. |
| 2007/0210120 A1 | 9/2007 | Kirschner |
| 2007/0221066 A1 | 9/2007 | Sullivan et al. |
| 2007/0259073 A1 | 11/2007 | Scarchilli et al. |
| 2007/0259074 A1 | 11/2007 | Searchilli et al. |
| 2007/0259142 A1 | 11/2007 | Lischefski et al. |
| 2007/0289453 A1 | 12/2007 | Halliday et al. |
| 2008/0028946 A1 | 2/2008 | Kirschner et al. |
| 2008/0028948 A1 | 2/2008 | Kirschner et al. |
| 2008/0038441 A1 | 2/2008 | Kirschner |
| 2008/0041231 A1 | 2/2008 | Beharry et al. |
| 2008/0050545 A1 | 2/2008 | Harvey |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0157443 A1 | 7/2008 | Hock |
| 2008/0193616 A1 | 8/2008 | Safko et al. |
| 2009/0036639 A1 | 2/2009 | Zhang et al. |
| 2009/0145988 A1 | 6/2009 | Kirschner et al. |
| 2009/0242070 A1 | 10/2009 | Green et al. |
| 2009/0263645 A1 | 10/2009 | Barger et al. |
| 2010/0000957 A1 | 1/2010 | Hutchinson et al. |
| 2010/0024658 A1 | 2/2010 | Jacobs et al. |
| 2010/0055290 A1 | 3/2010 | Schmidt et al. |
| 2010/0064899 A1 | 3/2010 | Aardenburg |
| 2010/0078446 A1 | 4/2010 | Halliday et al. |
| 2010/0107887 A1 | 5/2010 | Bentley et al. |
| 2010/0170402 A1 | 7/2010 | Kirschner |
| 2010/0215879 A1 | 8/2010 | Dooley et al. |
| 2010/0288131 A1* | 11/2010 | Kilber et al. .................. 99/295 |
| 2010/0303964 A1 | 12/2010 | Beaulieu et al. |
| 2010/0320225 A1 | 12/2010 | Kirschner |
| 2011/0105623 A1 | 5/2011 | Benjamin et al. |
| 2011/0117248 A1 | 5/2011 | Rivera |
| 2011/0136210 A1 | 6/2011 | Benjamin et al. |
| 2011/0139646 A1 | 6/2011 | Sonnenberg |
| 2011/0142987 A1 | 6/2011 | Edens et al. |
| 2011/0151083 A1 | 6/2011 | Soucy et al. |
| 2011/0168029 A1 | 7/2011 | Fulco |
| 2011/0183048 A1 | 7/2011 | Noble et al. |
| 2011/0185912 A1 | 8/2011 | Chen et al. |
| 2011/0200726 A1 | 8/2011 | Tinkler et al. |
| 2011/0212231 A1 | 9/2011 | McLaughlin |
| 2011/0239870 A1 | 10/2011 | Garman et al. |
| 2011/0244108 A1 | 10/2011 | Rabin |
| 2011/0259205 A1 | 10/2011 | Delorme |
| 2011/0265658 A1 | 11/2011 | Talon et al. |

OTHER PUBLICATIONS

Extended European Search Report for Application No. 12768514.7 dated Nov. 14, 2014; 8 pages.

\* cited by examiner

METHODS AND SYSTEMS FOR USE IN FORMING AN ARTICLE FROM A MULTI-LAYER SHEET STRUCTURE

CROSS-REFERENCE TO RELATED APPLICATIONS

This application claims priority to Provisional Patent Application No. 61/466,326 filed Mar. 22, 2011, which is hereby incorporated by reference in its entirety.

BACKGROUND OF THE INVENTION

The field of the invention relates generally to coffee makers and more particularly, to disposable cups used in connection with brewing coffee.

Numerous types of coffee makers are known, including percolator and electric drip type coffee makers. With a percolator type coffee maker, fresh coffee grounds typically are measured out in scoopfuls and placed into a metal percolator basket. The basket rests within a pot that holds water. As the water is heated in the pot, the water is forced through a metal tube and into the brew basket containing the coffee grounds. The hot water drains through the coffee grounds and brew basket, and drips back into a lower portion of the pot.

With such known percolators, small amounts of coffee grounds may leak into the fresh coffee. In addition, wet grounds are left in the percolator basket, and cleaning such wet grounds from the basket can be tedious.

For an electric drip type coffee maker, fresh coffee grounds are held in a paper filter in a brew basket mounted below a spray head. Water in a cold water reservoir is heated and moves through the machine onto the coffee from the spray head. The coffee passes through the filter and drips down into a coffee pot.

The wet paper filter and wet coffee grounds are removed from the brew basket when brewing is complete. The weight of the wet grounds may cause the filter to collapse and the grounds to spill. Cleaning up wet coffee grounds can be tedious.

In addition, many known coffee makers, including the coffee makers described above, typically are used to brew multiple cups of coffee. The taste of the coffee depends at least in part on the amounts of water and coffee used, as well as the freshness of the coffee. With such known coffee makers, the amount of water and coffee used generally depends on the experience of the user. Also, the freshness of the coffee can vary widely, depending in part on how long the coffee grounds have been stored and the manner in which the coffee grounds have been stored. Further, if only a single serving of coffee is desired, this can lead to waste of fresh coffee grounds, water, and energy.

Single serve coffee makers are known. Such single, or individual, serve coffee makers typically utilize a single serve fresh coffee ground container and the brewed coffee is dispensed directly into a coffee cup. The fresh coffee ground container typically facilitates sealing the coffee grounds in the container until use, so that the coffee grounds are fresh.

In connection with brewing coffee, the individual coffee container is punctured on the top and on the bottom so that hot water can flow into the container onto the coffee, and brewed coffee can flow out of the container. The coffee container therefore should withstand the hot temperature of the hot water without deforming or collapsing, as well as have sufficient strength to withstand being punctured without being crushed. In addition, the coffee container should not be so expensive to fabricate and seal so as to drive the price of using a single serve coffee maker beyond the reach of ordinary consumers. In order to meet the structural and cost objectives set forth above, typically single serve coffee container are fabricated using polystyrene plastics.

As explained above, single serve coffee containers are configured to be used once and then discarded. Polystyrene plastic, however, is not as environmentally friendly and has a high carbon foot print, as compared to other types of plastics.

BRIEF DESCRIPTION OF THE INVENTION

In one aspect, a mold is provided for use in forming a container. The mold includes a forming insert that includes an upper portion and a lower portion. The upper portion includes a sidewall segment and a heel segment extending from a bottom of the sidewall segment. The sidewall segment has a sidewall radius, and the heel segment has a heel radius that is less than the sidewall radius. The lower portion extends axially downward from the upper portion to define a base cavity. A forming base is positionable within the base cavity. The forming base has a top surface that includes a rim and a step extending axially upward from the rim. The rim has a rim radius that is less than the heel radius and the step has a step radius that is less than the rim radius.

In another aspect, a mold is provided for use in forming a container. The mold includes a forming insert that includes an upper portion and a lower portion. The upper portion includes a sidewall segment and a heel segment extending from a bottom of the sidewall segment. The sidewall segment has a sidewall radius, and the heel segment has a heel radius that is less than the sidewall radius. The lower portion extends axially downward from the upper portion to define a base cavity. A forming base is positionable within the base cavity. The forming base has a top surface that includes a plurality of ribs that increase in height from the heel segment toward a center of the forming base.

In yet another aspect, a mold is provided for use in forming a container. The mold includes a forming insert that includes an upper portion and a lower portion. The upper portion includes a sidewall segment, a plurality of flutes disposed circumferentially about the forming insert, and a heel segment extending from a bottom of the sidewall segment. The sidewall segment has a sidewall radius, and the heel segment has a heel radius that is less than the sidewall radius. The lower portion extends axially downward from the upper portion to define a base cavity. The plurality of flutes extend generally axially along the sidewall segment. A forming base is positionable within the base cavity. The forming base has a top surface that includes a rim and a step extending axially upward from the rim. The rim has a rim radius that is less than the heel radius, and the step has a step radius that is less than the rim radius.

In yet another aspect, a method is provided for forming a container. The method includes positioning a forming base within a mold cavity defined by a lower portion of a forming insert. The forming base has a top surface that includes a rim and a step extending axially upward from the rim. The rim has a rim radius that is less than the heel radius, and the step has a step radius that is less than the rim radius. A multi-layer sheet structure that includes a polypropylene composition is extended across an opening defined by an upper portion of the forming insert. The upper portion includes a sidewall segment and a heel segment extending from a bottom of the sidewall segment. The sidewall segment has a sidewall radius, and the heel segment has a heel radius that is less than the sidewall radius. Air is drawn out of the mold cavity to pull the multi-layer sheet structure towards at least one of the top surface and the upper portion.

DETAILED DESCRIPTION OF THE INVENTION

Figure 1:
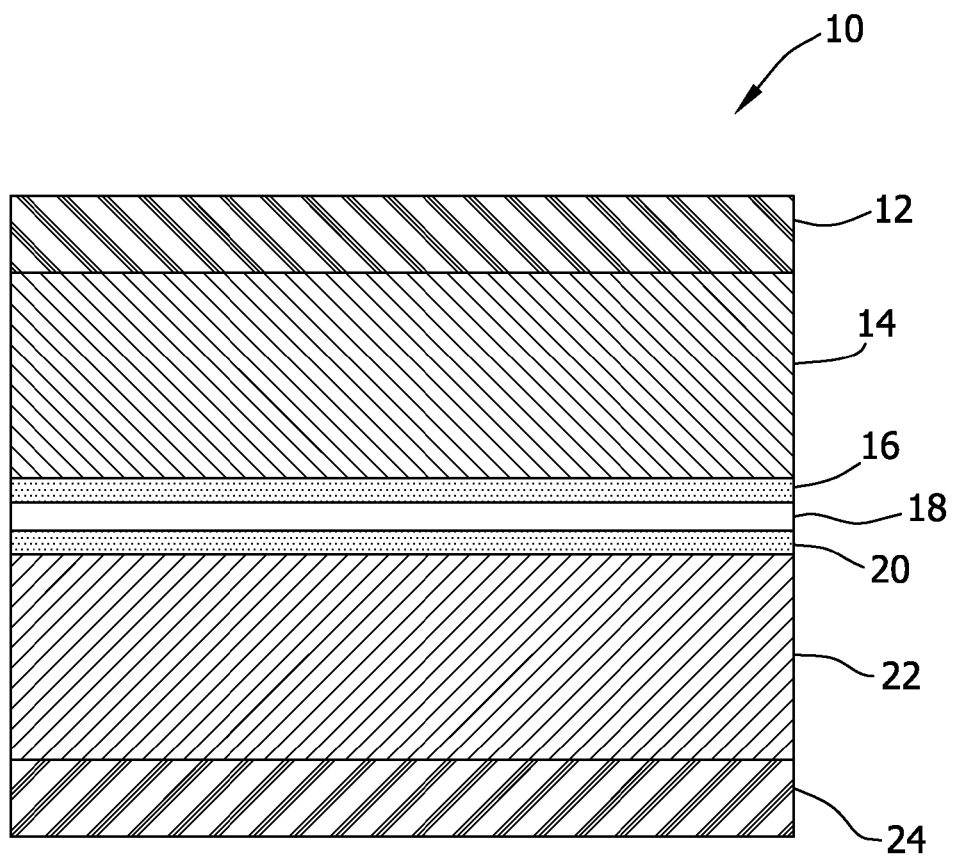
FIG. 1 is a cross sectional schematic illustration of an example embodiment of a multi-layer sheet structure.

Various embodiments of a sealable single use coffee container, as well as processes and materials that can be used to fabricate such containers, are described. The container is fabricated from a multi-layer sheet that includes a polypropylene composition. Polypropylene is commonly recycled. In addition, the container has sufficient strength to withstand being punctured without being crushed and can withstand the hot temperatures of hot water used to brew coffee without deforming.

The specific configuration of the coffee container depends, at least to some extent, on the particular configuration of the coffee maker with which the container will be used. For example, the container size, shape, and reinforcement component depend on where the container will be punctured, the configuration of the coffee maker (e.g., the configuration of the portion that holds the container) holder A multi-layer thermoplastic sheet structure, an article formed from the multi-layer sheet structure, and a method of forming the article is described below in detail. The multi-layer sheet structure, in an exemplary embodiment, includes seven layers. Specifically, the sheet structure includes an outer top layer of polypropylene, an inner top layer of polypropylene, a first adhesive layer (tie layer), a barrier layer, a second adhesive layer (tie layer), an inner bottom layer of polypropylene, and an outer bottom layer of polypropylene. Although the sheet structure is specifically described herein as having seven layers, it is contemplated additional layers or fewer layers could be utilized in the sheet. For example, in another embodiment, the sheet structure may include five layers. Specifically, the sheet structure includes a top layer of polypropylene, an adhesive layer (tie layer), a barrier layer, another adhesive layer (tie layer) and a bottom layer of polypropylene. In other embodiments, the multi-layer sheet structure may include from two layers to eight layers. Some examples of a multi-layer sheet structure include a two layer structure that may include two polypropylene layers; a six layer structure that may include a barrier layer, two adhesive layers one on each side the barrier layer, one polypropylene layer on one adhesive layer and two polypropylene layers on the other adhesive layer; and an eight layer structure that may include a barrier layer, two adhesive layers one on each side the barrier layer, three polypropylene layers on one adhesive layer and two polypropylene layers on the other adhesive layer.

The multi-layer sheet structure may be used for forming various articles, for example, cups and cup shaped containers. The multi-layer sheet structure can be molded into various articles using methods known in the art including, for example, pressure forming, thermoforming, plug assisted thermoforming, thermal stamping, vacuum forming, compression forming, and the like. All the ingredients in the multi-layer sheet structure are FDA approved which permit the use of cups and cup shaped containers formed from the multi-layer sheet structure to come in contact with food and liquids for human consumption.

Cup shaped containers may be formed using a plug assisted thermoforming process that utilizes cup shaped molds and plugs to assist the sheet structure into the mold and distribute the materials of multi-layer sheet structure around the mold to form a cup shaped container having a uniform wall, and uniform heel and the bottom area of the cup shaped container. The molds are designed to improve the material distribution around the cup shaped container wall, the heel area and the bottom area over known cup shaped containers. In addition, when the cup shaped container is used in a coffee brewing machine, the design of the mold and the distribution of the material of the multi-layer sheet structure in the bottom area permit clean punctures by the coffee brewing machine in the bottom area of the cup shaped container.

Referring to the drawings, FIG. 1 is a cross sectional schematic illustration of an exemplary embodiment of a multi-layered sheet structure 10 that includes seven layers. Specifically, multi-layer sheet structure 10 includes an outer top layer 12 (also referred to herein as first layer 12) formed of a polypropylene composition, an inner top layer 14 (also referred to herein as second layer 14) formed of a polypropylene composition, a tie layer 16 (also referred to herein as third layer 16) formed of an adhesive material, a barrier layer 18 (also referred to herein as fourth layer 18), a tie layer 20 (also referred to herein as fifth layer 20) formed of an adhesive material, an inner bottom layer 22 (also referred to herein as sixth layer 22) formed of the polypropylene composition of inner top layer 14, and an outer bottom layer 24 (also referred to herein as seventh layer 24) formed of the polypropylene composition of outer top layer 12. The polypropylene composition of outer top layer 12 and the polypropylene composition of inner top layer 14 may be the same polypropylene composition, or different polypropylene compositions.

The polypropylene composition of first layer 12 includes a polypropylene. The polypropylene may be at least one of a polypropylene homopolymer, polypropylene copolymer, and blends with polypropylene and compatible polymers. The polypropylene composition may also include a color concentrate and an inorganic reinforcing agent. The color concentrate may include color pigments and/or dyes dispersed in solvents and/or a polymer compatible with polypropylene. Any suitable inorganic reinforcing agent may be used, for example, talc, mica, glass, silica, whiskers, wollastonite, carbon fiber, aramid fibers, and the like. The polypropylene composition of first layer 12 may include about 2 to about 6 percent by weight of the color concentrate, about 50 to about 70 percent by weight of polypropylene, and about 5 to about 60 percent by weight of the inorganic reinforcing agent, the weight percent based on the total weight of the polypropylene composition. Alternatively, the polypropylene of first layer 12 may include about 4 percent by weight of the color concentrate, about 61 percent by weight of polypropylene, and about 35 percent by weight of the inorganic reinforcing agent, the weight percent based on the total weight of the polypropylene composition.

In another embodiment, the polypropylene composition of first layer 12 may also include a renewable plastics material or bioplastic, for example, a corn starch product. The corn starch product is a resin made from corn starch and referred to as Plastarch Material (PSM). Other bioplastics include, but not limited to, polylactic acid (PLA), modified PLA, polyhydroxyalkanoates (PHA), modified PHA, poly(hydroxybutyrate-co-valerate) (PHBV), poly(hydroxubutyrate-co-hexanoate) (PHBH), and blends of these bioplastics with other plastics, for example polypropylene, polyethylene, and the like. In this embodiment, the polypropylene composition of first layer 12 may include about 2 to about 6 percent by weight of the color concentrate, about 5 to about 65 percent by weight of polypropylene, about 5 to about 75 percent by weight of the renewable plastics material, and about 10 to about 40 percent by weight of the inorganic reinforcing agent, the weight percent based on the total weight of the polypropylene composition. Alternatively, the polypropylene composition of first layer 12 may include about 4 percent by weight of the color concentrate, about 46 percent by weight of polypropylene, about 20 percent by weight of the renewable plastics material, and about 30 percent by weight of the inorganic reinforcing agent, the weight percent based on the total weight of the polypropylene composition. In another embodiment, the polypropylene composition of first layer 12 may be 100 percent by weight of polypropylene, and in another embodiment first layer 12 may be 100 percent by weight of renewable plastics materials.

In a further embodiment, the multi-layer sheets described above that were not used and left over after a thermoforming process may be recycled and added to a virgin polypropylene composition. Multi-layer sheets and/or portions of the sheets that are left over after a thermoforming process are ground-up and added to a virgin polypropylene composition. The ground-up recycled material includes each of the materials used to form each layer of the multi-layer sheets. The polypropylene composition of first layer 12 may include up to about 50 percent of the recycled material. The use of recycled material facilitates producing economically viable products formed from multi-layered sheet structure 10.

The polypropylene composition of second layer 14 may be any of the embodiments of the polypropylene composition of first layer 12 described above. The polypropylene composition of first layer 12 and the polypropylene composition of second layer 14 may be the same polypropylene composition, or may be different polypropylene compositions.

The polypropylene composition of sixth layer 22 may be any of the embodiments of the polypropylene composition of first layer 12 described above, and the polypropylene composition of seventh layer 24 may be any of the embodiments of the polypropylene composition of first layer 12. The polypropylene composition of sixth layer 22 and the polypropylene composition of seventh layer 24 may be the same polypropylene composition, or may be different polypropylene compositions.

Any of the polypropylene compositions described above may be prepared by melt compounding the components with equipment known in the art. The equipment may include continuous and batch mixers, for example, Farrel Continuous Mixers available from Farrel Corporation, Ansonia, Conn., Banbury® mixers available from Farrel Corporation, single screw extruders, multiple screw extruders, and the like. In addition, compounding and melt mixing of the components in a continuous fashion, in-line with the production of extruded multi-layer sheet structure 10 may also be used.

Third layer 16 and fifth layer 20 are tie or adhesive layers formed of an adhesive material. The adhesive material is used to bond second layer 14 to fourth layer 18, and to bond sixth layer 22 to fourth layer 18. Suitable adhesive material that may be used include, but not limited to, a maleic anhydride grafted polypropylene adhesive, a functionalized polyethylene, a functionalized polypropylene, for example, a copolymer with polypropylene, a polyamide, blends of polyethylene and polypropylene containing active groups capable of reacting with the material of barrier layer 18.

Fourth layer 18 is a barrier layer and is formed by at least one of poly(ethylene vinyl alcohol) (EVOH), polyvinyl alcohol (PVOH), polyvinylidene chloride (PVDC), polyamide, acrylate copolymers, cyclic olefin copolymers, and the like. Fourth layer 18 may also include fillers, for example, active/passive scavengers, nanofillers including talc, glass, clay, silica, mica, and the like.

Multi-layer sheet structure 10 has a thickness of about 10 mil to about 135 mil. Alternately, multi-layer sheet structure 10 has a thickness of about 35 mil to about 60 mil. First layer 12 has a thickness of about 0.5 mil to about 15 mil, second layer 14 has a thickness of about 3.5 mil to about 77.5 mil, third layer 16 has a thickness of about 0.5 mil to about 5 mil, fourth layer 18 has a thickness of about 0.5 mil to about 5 mil, fifth layer 20 has a thickness of about 0.5 mil to about 5 mil, sixth layer 22 has a thickness of about 3.5 mil to about 77.5 mil, and seventh layer 24 has a thickness of about 0.5 mil to about 15 mil.

Figure 2:
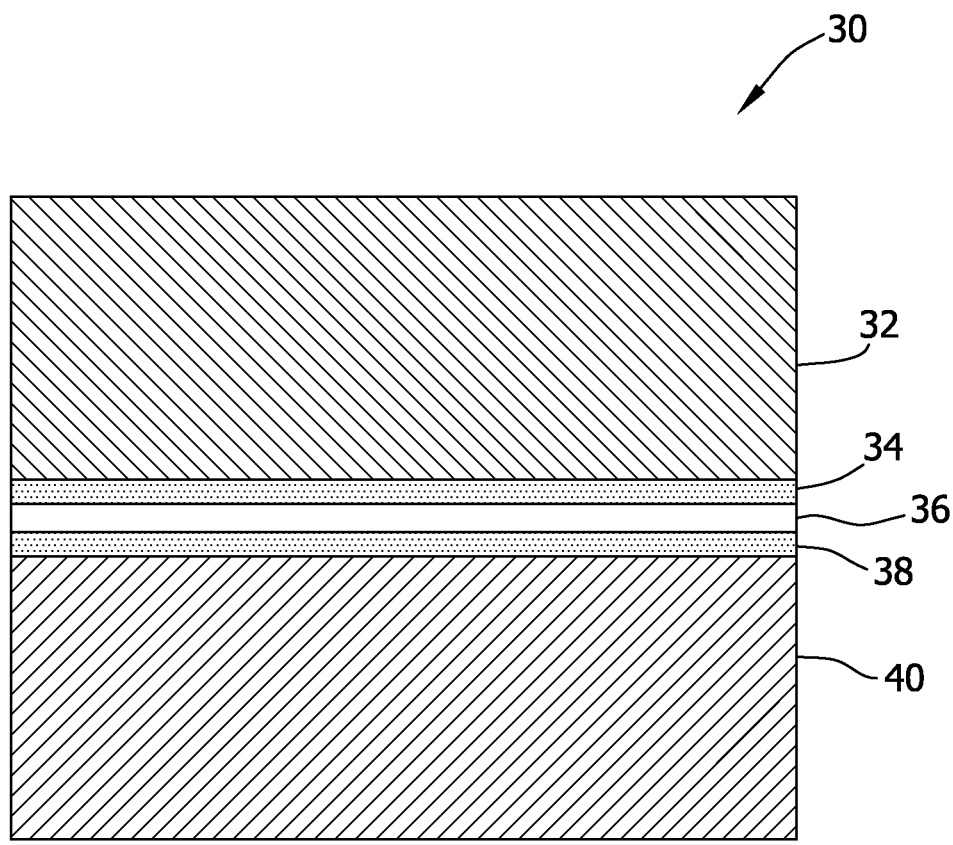
FIG. 2 is a cross sectional schematic illustration of another embodiment of a multi-layer sheet structure.

FIG. 2 is a cross sectional schematic illustration of an embodiment of a multi-layered sheet structure 30 that includes five layers. Specifically, multi-layer sheet structure 30 includes a top layer 32 (also referred to herein as first layer 32) formed of a polypropylene composition, a tie layer 34 (also referred to herein as second layer 34) formed of an adhesive material, a barrier layer 36 (also referred to herein as third layer 36), a tie layer 38 (also referred to herein as fourth layer 38) formed of an adhesive material, and a bottom layer 40 (also referred to herein as fifth layer 40) formed of a polypropylene composition.

The polypropylene composition of first layer 32 may be any of the embodiments of the polypropylene composition of first layer 12 described above and shown in FIG. 1, and the polypropylene composition of fifth layer 40 may be any of the embodiments of the polypropylene composition of first layer 12 described above and shown in FIG. 1. The polypropylene composition of first layer 32 and the polypropylene composition of fifth layer 40 may be the same polypropylene composition, or may be different polypropylene compositions.

Second layer 36 and fourth layer 38 are tie or adhesive layers formed of an adhesive material. The adhesive material is used to bond first layer 32 to third layer 36, and to bond fifth layer 40 to third layer 36. Suitable adhesive material that may be used include, but not limited to, a maleic anhydride grafted polypropylene adhesive, a functionalized polyethylene, a functionalized polypropylene, for example, a copolymer with polypropylene, polyamide, blends of polyethylene, and polypropylene containing active groups capable of reacting with the material of the third layer 36.

Third layer 36 is a barrier layer and is formed by at least one of poly(ethylene vinyl alcohol) (EVOH), polyvinyl alcohol (PVOH), polyvinylidene chloride (PVDC), polyamide, acrylate copolymers, cyclic olefin copolymers, and the like. Third layer 36 may also include fillers, for example, active/passive scavengers, nanofillers including talc, glass, clay, silica, mica, and the like.

Figure 3:
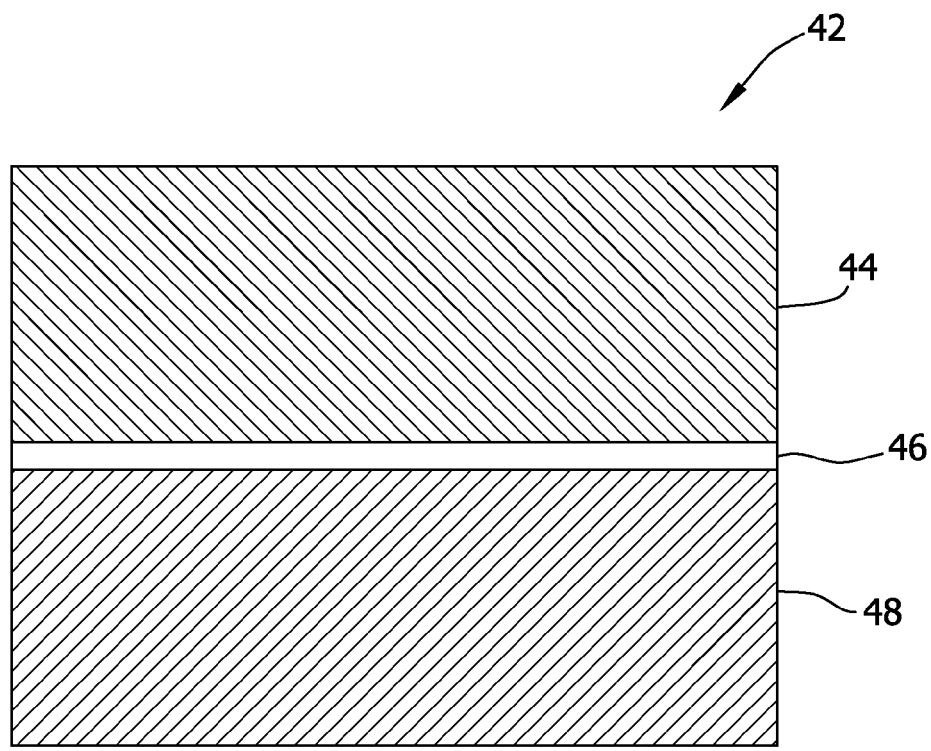
FIG. 3 is a cross sectional schematic illustration of another embodiment of a multi-layer sheet structure.

FIG. 3 is a cross sectional schematic illustration of an embodiment of a multi-layered sheet structure 42 that includes three layers. Specifically, multi-layer sheet structure 42 includes a top layer 44 (also referred to herein as first layer 44) formed of a polypropylene composition, a barrier layer 46 (also referred to herein as second layer 46), and a bottom layer 48 (also referred to herein as third layer 48) formed of a polypropylene composition.

The polypropylene composition of first layer 44 may be any of the embodiments of the polypropylene composition of first layer 12 described above and shown in FIG. 1, and the polypropylene composition of third layer 48 may be any of the embodiments of the polypropylene composition of first layer 12 described above and shown in FIG. 1. The polypropylene composition of first layer 44 and the polypropylene composition of third layer 48 may be the same polypropylene composition, or may be different polypropylene compositions.

Second layer 46 is a barrier layer and is formed by at least one of poly(ethylene vinyl alcohol) (EVOH), polyvinyl alcohol (PVOH), polyvinylidene chloride (PVDC), polyamide, acrylate copolymers, cyclic olefin copolymers, and the like. Second layer 46 may also include fillers, for example, active/passive scavengers, nanofillers including talc, glass, clay, silica, mica, and the like.

Figure 4:
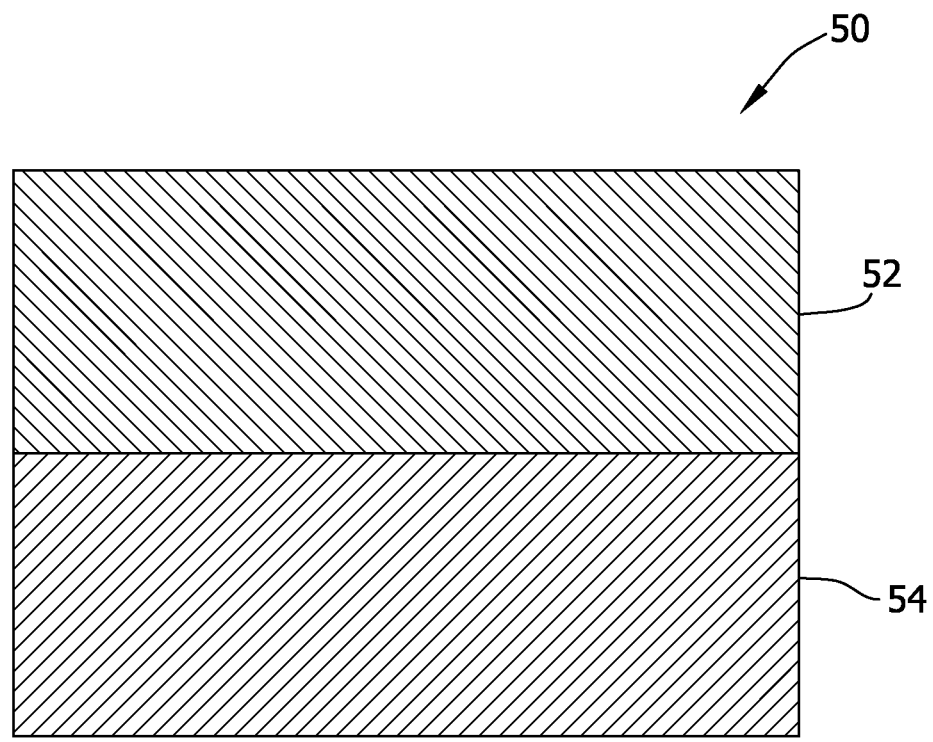
FIG. 4 is a cross sectional schematic illustration of another embodiment of a multi-layer sheet structure.
Figure 5:
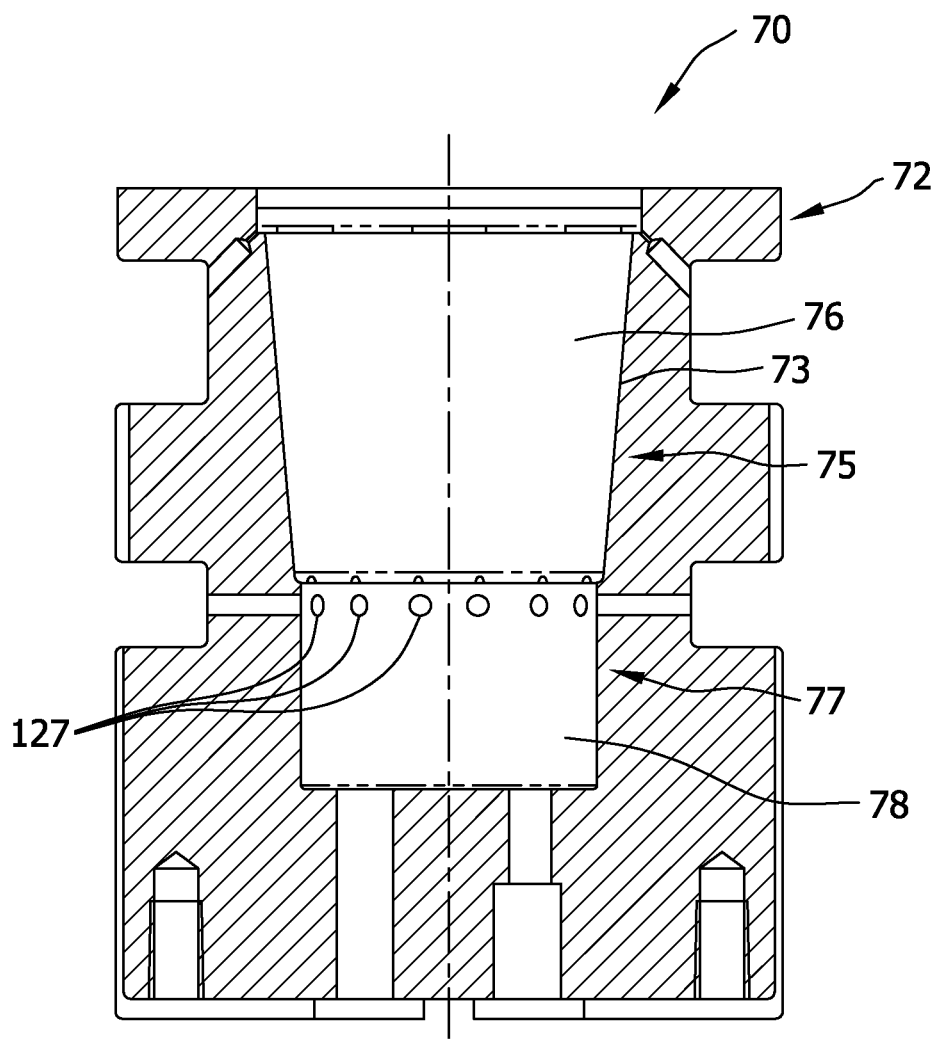
FIG. 5 is a schematic illustration of an example embodiment of a forming insert.
Figure 6:
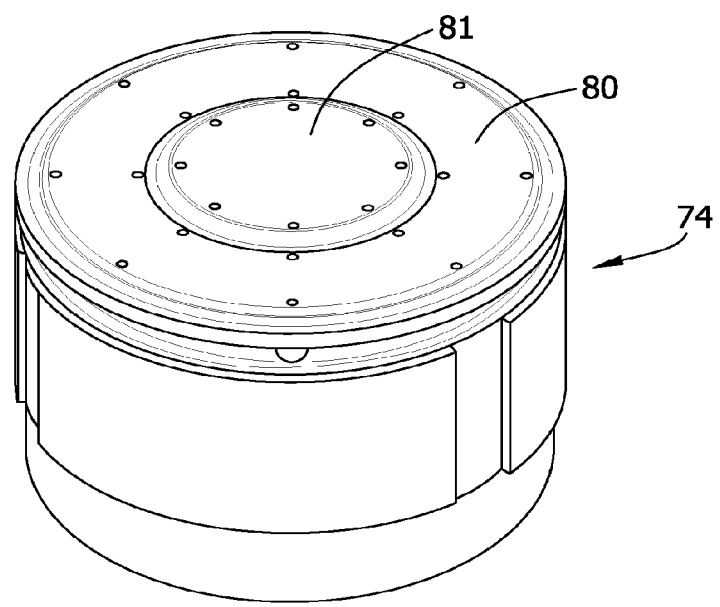
FIG. 6 is a perspective view of an example embodiment of a forming base that may be used with the forming insert shown in FIG. 5.
Figure 7:
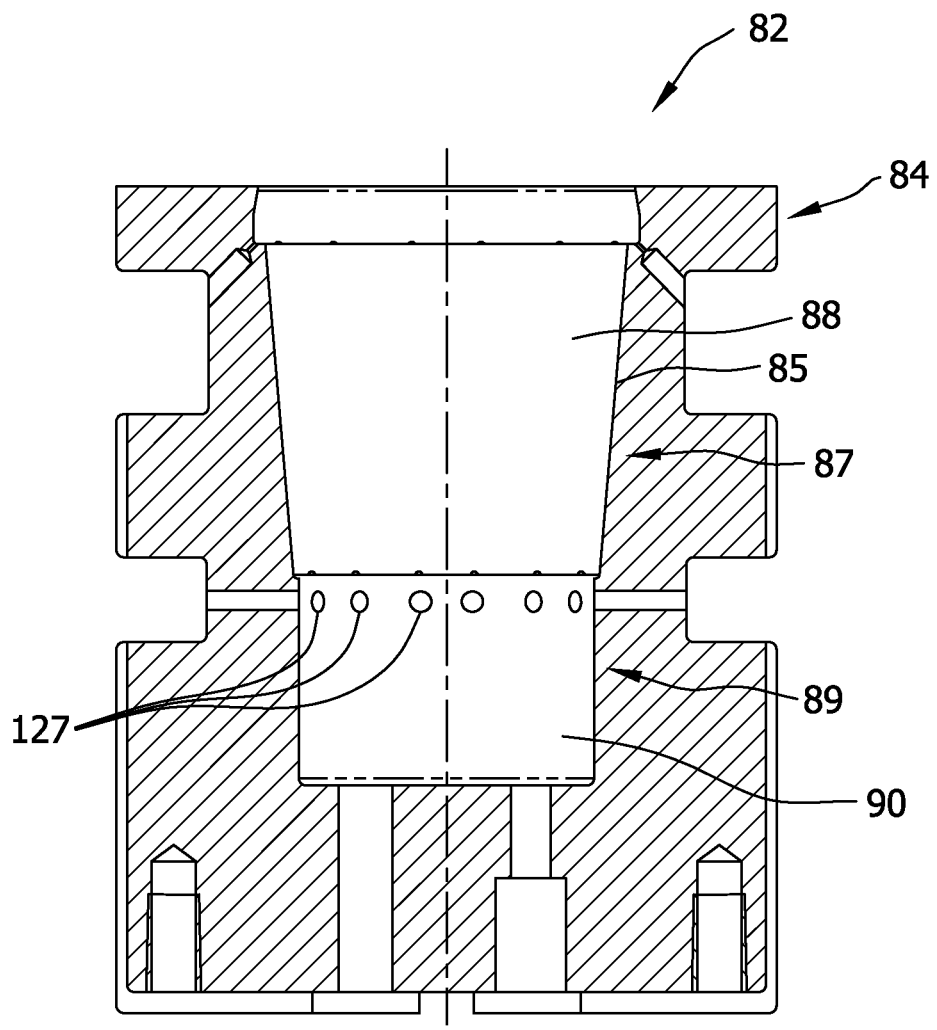
FIG. 7 is a schematic illustration of another example embodiment of a forming insert.

FIG. 4 is a cross sectional schematic illustration of an embodiment of a multi-layered sheet structure 50 that includes two layers. Specifically, multi-layer sheet structure 40 includes a top layer 52 (also referred to herein as first layer 52) formed of a polypropylene composition, and a bottom layer 54 (also referred to herein as second layer 54) formed of a polypropylene composition.

The polypropylene composition of first layer 52 may be any of the embodiments of the polypropylene composition of first layer 12 described above and shown in FIG. 1, and the polypropylene composition of third layer 54 may be any of the embodiments of the polypropylene composition of first layer 12 described above and shown in FIG. 1. The polypropylene composition of first layer 52 and the polypropylene composition of second layer 52 may be the same polypropylene composition, or may be different polypropylene compositions.

Multi-layer sheet structure 10 may be fabricated by a co-extrusion process. Specifically, multi-layer structure 10 may be formed by co-extruding first layer 12, second layer 14, third layer 16, fourth layer 18, fifth layer 20, sixth layer 22 and seventh layer 24. A plurality of extruders are connected to a feed block that includes a die for extruding multiple layers at once. Three to nine extruders may be used, and the feed block connected to the extruders has a die for forming from 3 to 13 layers. In the exemplary embodiment, five extruders are used to feed the materials for each of the layers to the feed block to form the seven layers of multi-layer sheet structure 10. In alternative embodiments, four extruders or six extruders may be used to feed the materials for each of the layers to the feed block to form the seven layers of multi-layer sheet structure 10. Other co-extruding techniques can be used, for example, a multi-manifold die may be used instead of a feed block. In addition, groups of multiple layers may be co-extruded and then laminated together to form multi-layer sheet structure 10. For example first layer 12 and second layer 14 are co-extruded to form a first sheet, and third, fourth, and fifth layers 16, 18, and 20 are co-extruded separate from first and second layers 12 and 14 to form a second sheet. Also, sixth layer 22 and seventh layer are co-extruded separate from first, second, third, fourth, and fifth layers 12, 14, 16, 18, and 20 to form a third sheet. Then the three sheets are laminated to form multi-layer structure 10.

In the exemplary embodiment, multi-layer sheet structure 10 may be used for forming various articles, for example, cups and cup shaped containers. Specifically, cup shaped containers are formed using a plug assisted thermoforming process that utilizes cup shaped molds and plugs to assist sheet structure 10 into the mold and distribute the materials of multi-layer sheet structure around the mold to form a cup shaped container having a uniform wall, and uniform heel and the bottom area of the cup shaped container.

FIGS. 5-12 are schematic illustrations of various molds that may be used to mold articles, for example, cups and cup shaped containers from multi-layer sheet structure 10. For example, mold 70 includes a forming insert 72 (shown in FIG. 5) and a forming base 74 (shown in FIG. 6). In the exemplary embodiment, forming insert 72 has a sidewall 73 that enables a cup to be molded within mold 70. More specifically, in the exemplary embodiment, a sidewall upper portion 75 defines a mold cavity 76 that is sized and/or shaped to provide the shape of a flange, a sidewall, and/or a heel of a cup being molded by mold 70. In the exemplary embodiment, the flange has a flange radius, the sidewall has a sidewall radius that is less than the flange radius, and the heel has a heel radius that is less than the sidewall radius.

For example, in the exemplary embodiment, the flange radius is between approximately 0.87 in. and 0.92 in., and the heel radius is between approximately 0.65 in. and 0.69 in. Moreover, in the exemplary embodiment, sidewall 73 extends between the heel and the flange at an angle that is approximately 5.56° from a vertical axis of the cup molded within mold 70. The flange, the sidewall, and/or the heel may have any suitable size and/or shape that enables mold 70 and/or the cup to function as described herein.

In the exemplary embodiment, a sidewall lower portion 77 defines a base cavity 78 that is sized and/or shaped to receive forming base 74. Forming base 74 includes a top surface 80 that is sized and/or shaped to provide the shape of a bottom and/or the heel of the cup being molded by mold 70. In the exemplary embodiment, top surface 80 includes a rim and at least one step 81 extending axially upward from the rim and/or from another step. In the exemplary embodiment, the rim and/or step 81 are substantially centrally aligned with respect to top surface 80. In the exemplary embodiment, a first step disposed radially inward of the rim extends axially upward from the rim, and a second step disposed radially inward of the first step extends axially upward from the first step. In the exemplary embodiment, the rim has a rim radius that is less than the heel radius, and step 81 has a step radius that is less than the rim radius.

For example, in the exemplary embodiment, the rim diameter is between approximately 0.60 in. and 0.66 in., the first step radius is between approximately 0.35 in. and 0.61 in., and the second step radius is between approximately 0.28 in. and 0.36 in. As such, the second step radius is between approximately 44% and 60% of the rim radius, a width of first step 81 (i.e., distance between the rim and the second step) is between approximately 40% and 56% of the first step radius, and a width of the rim (i.e., distance between the first step and the edge of the cup) is less than approximately 8% of the rim radius. The rim and/or step 81 may have any suitable size and/or shape that enables mold 70 and/or the cup to function as described herein.

Figure 8:
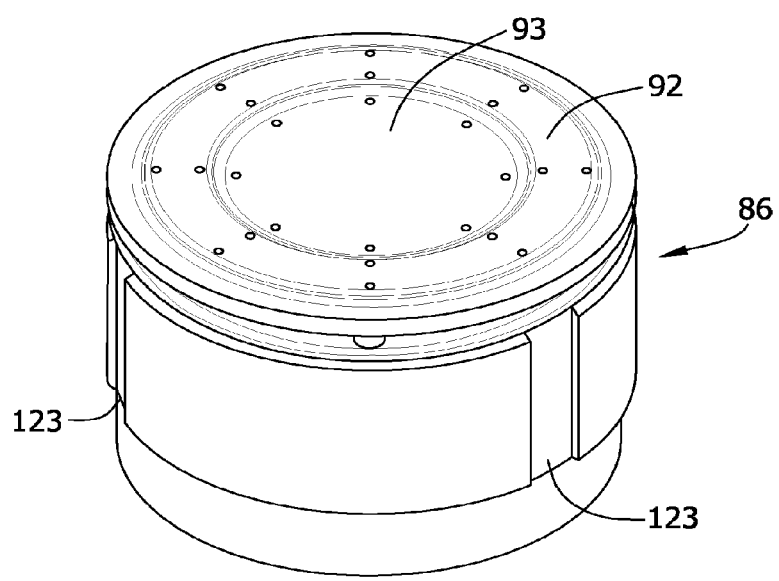
FIG. 8 is a perspective view of an example embodiment of a forming base that may be used with the forming insert shown in FIG. 7.
Figure 9:
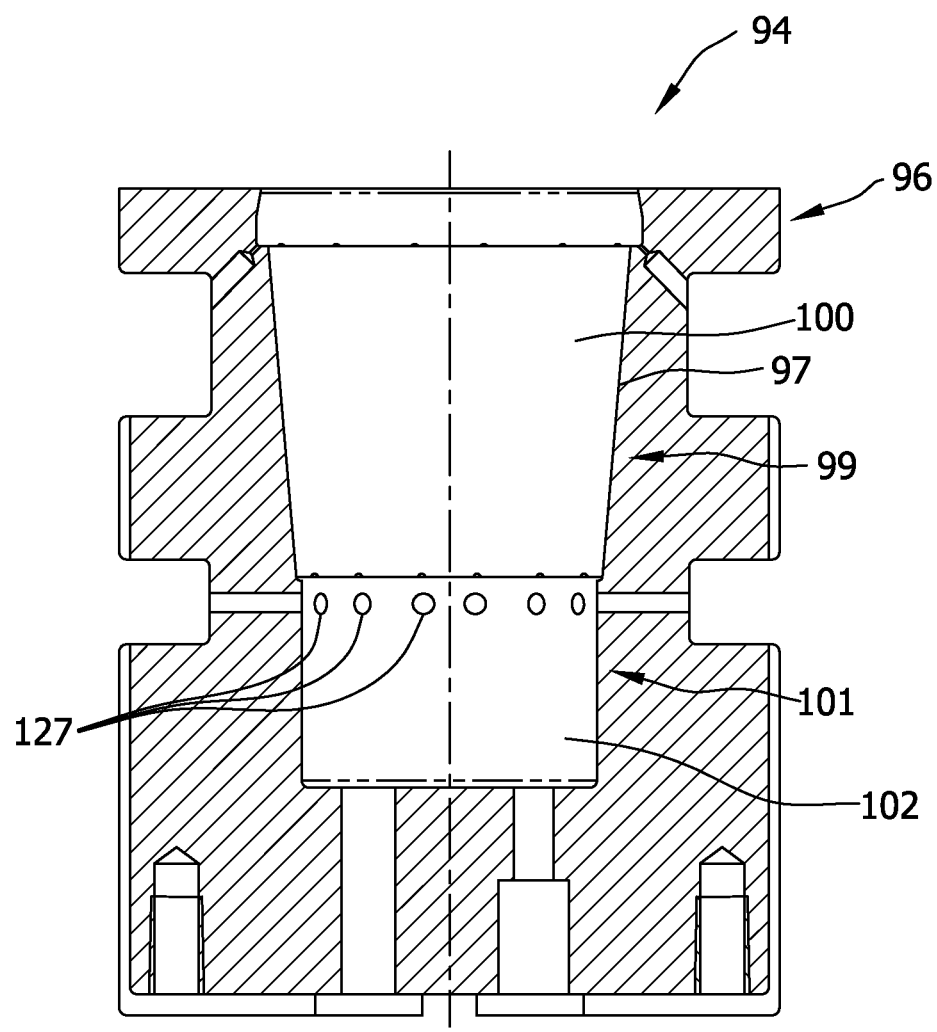
FIG. 9 is a schematic illustration of another example embodiment of a forming insert.

Mold 82 includes a forming insert 84 (shown in FIG. 7) and a forming base 86 (shown in FIG. 8). In the exemplary embodiment, forming insert 84 has a sidewall 85 that enables a cup to be molded within mold 82. More specifically, in the exemplary embodiment, a sidewall upper portion 87 defines a mold cavity 88 that is sized and/or shaped to provide the shape of a flange, a sidewall, and/or a heel of a cup being molded by mold 82. In the exemplary embodiment, the flange has a flange radius, the sidewall has a sidewall radius that is less than the flange radius, and the heel has a heel radius that is less than the sidewall radius. For example, in the exemplary embodiment, the flange radius is between approximately 0.86 in. and 0.92 in., and the heel radius is between approximately 0.62 in. and 0.69 in. Moreover, in the exemplary embodiment, sidewall 73 extends between the heel and the flange at an angle that is approximately 5.81° from a vertical axis of the cup molded within mold 82. The flange, the sidewall, and/or the heel may have any suitable size and/or shape that enables mold 82 and/or the cup to function as described herein.

In the exemplary embodiment, a sidewall lower portion 89 defines a base cavity 90 that is sized and/or shaped to receive forming base 86. Forming base 86 includes a top surface 92 that is sized and/or shaped to provide the shape of a bottom and/or the heel of the cup being molded by mold 82. In the exemplary embodiment, top surface 92 includes a rim and at least one step 93 extending axially upward and/or downward from the rim and/or from another step. In the exemplary embodiment, the rim and/or step 93 are substantially centrally aligned with respect to top surface 92. In the exemplary embodiment, a first step disposed radially inward of the rim extends axially upward from the rim, and a second step disposed radially inward of the first step extends axially downward from the first step. In the exemplary embodiment, the rim has a rim radius that is less than the heel radius, and step 81 has a step radius that is less than the rim radius.

For example, in the exemplary embodiment, the rim radius is between approximately 0.57 in. and 0.63 in., the first step radius is between approximately 0.43 in. and 0.58 in., and the second step radius is between approximately 0.37 in. and 0.44 in. As such, the second step radius is between approximately 60% and 76% of the rim radius, a width of first step 81 (i.e., distance between the rim and the second step) is between approximately 24% and 40% of the first step radius, and a width of the rim (i.e., distance between the first step and the edge of the cup) is less than approximately 9% of the rim radius. The rim and/or step 93 may have any suitable size and/or shape that enables mold 82 and/or the cup to function as described herein.

Figure 10:
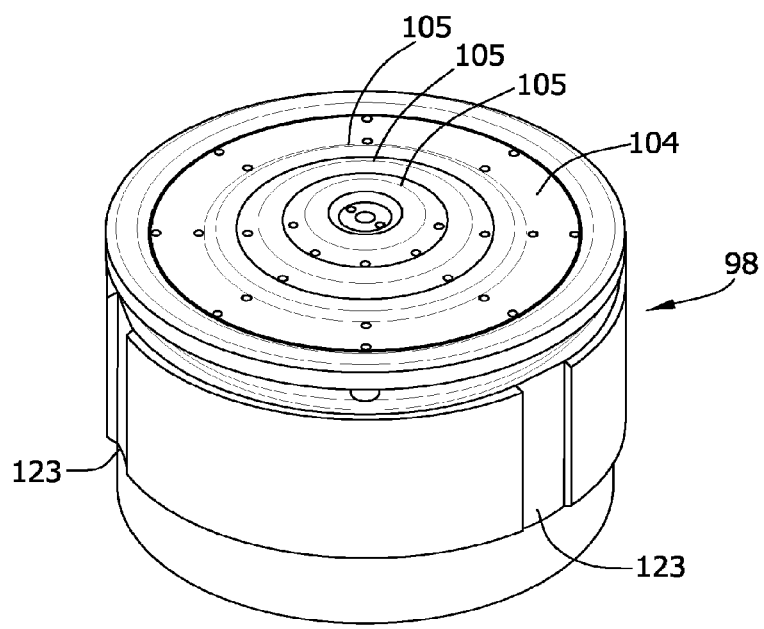
FIG. 10 is a perspective view of an example embodiment of a forming base that may be used with the forming insert shown in FIG. 9.
Figure 11:
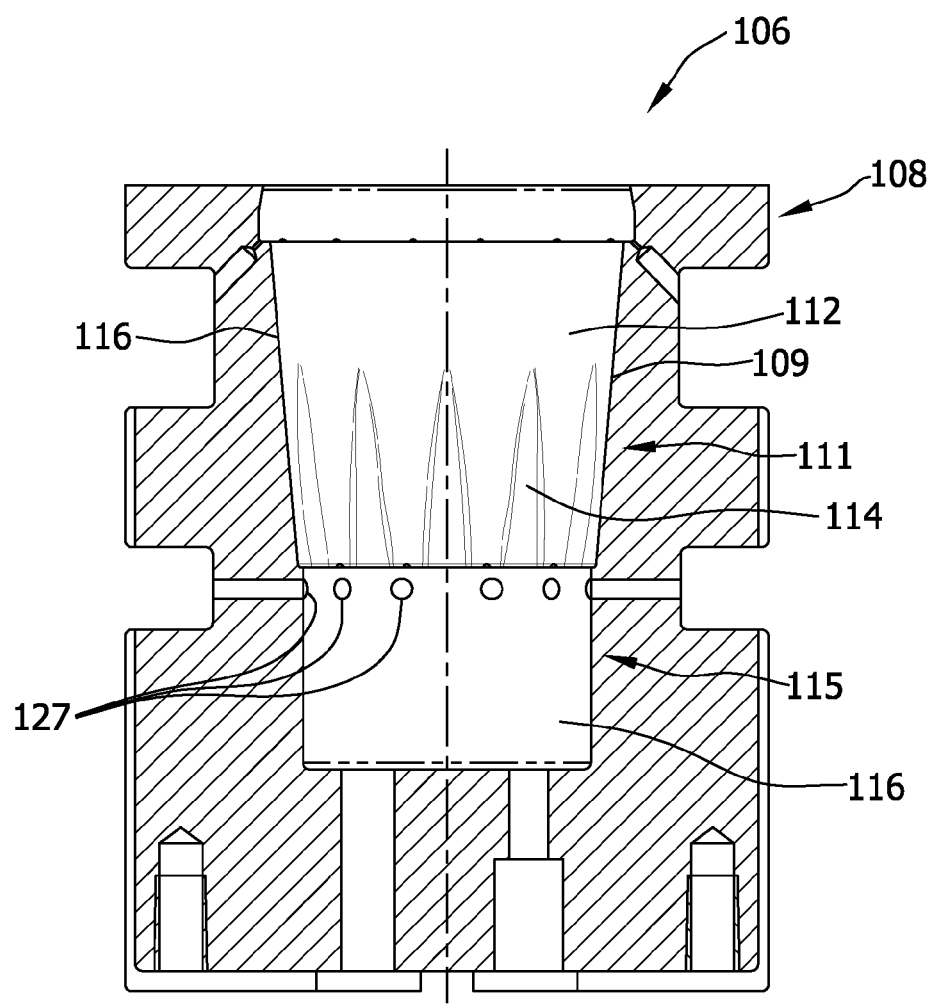
FIG. 11 is a schematic illustration of another example embodiment of a forming insert.

Mold 94 includes a forming insert 96 (shown in FIG. 9) and a forming base 98 (shown in FIG. 10). In the exemplary embodiment, forming insert 96 has a sidewall 97 that enables a cup to be molded within mold 94. More specifically, in the exemplary embodiment, a sidewall upper portion 99 defines a mold cavity 100 that is sized and/or shaped to provide the shape of a flange, a sidewall, and/or a heel of a cup being molded by mold 94. In the exemplary embodiment, the flange has a flange radius, the sidewall has a sidewall radius that is less than the flange radius, and the heel has a heel radius that is less than the sidewall radius. For example, in the exemplary embodiment, the flange radius is between approximately 0.86 in. and 0.92 in., and the heel radius is between approximately 0.63 in. and 0.69 in. Moreover, in the exemplary embodiment, sidewall 73 extends between the heel and the flange at an angle that is approximately 5.81° from a vertical axis of the cup molded within mold 94. The flange, the sidewall, and/or the heel may have any suitable size and/or shape that enables mold 94 and/or the cup to function as described herein.

In the exemplary embodiment, a sidewall lower portion 101 defines a base cavity 102 that is sized and/or shaped to receive forming base 98. Forming base 98 includes a top surface 104 that is sized and/or shaped to provide the shape of a bottom and/or the heel of the cup being molded by mold 94. In the exemplary embodiment, top surface 104 includes a plurality of ribs 105 that increase in height from the heel toward a center of forming base 98. In the exemplary embodiment, ribs 105 are substantially centrally aligned with respect to top surface 104. Ribs 105 may have any suitable size and/or shape that enables mold 94 and/or the cup to function as described herein.

Figure 12:
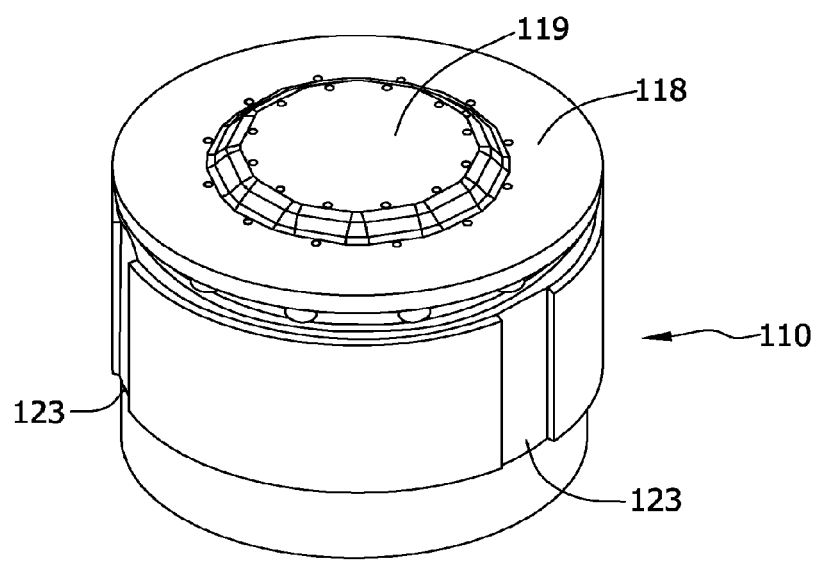
FIG. 12 is a perspective view of an example embodiment of a forming base that may be used with the forming insert shown in FIG. 11.
Figure 13:
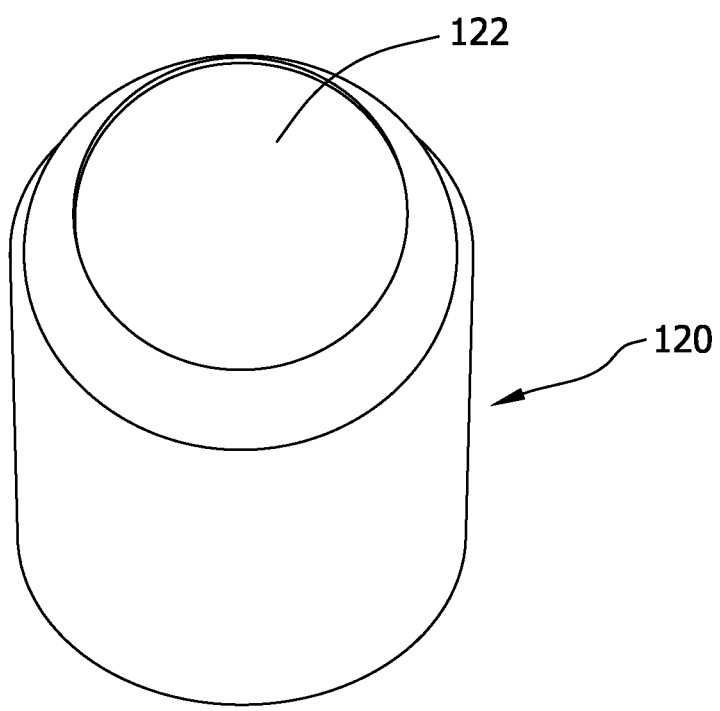
FIG. 13 is a perspective view of an example embodiment of a mold plug.
Figure 14:
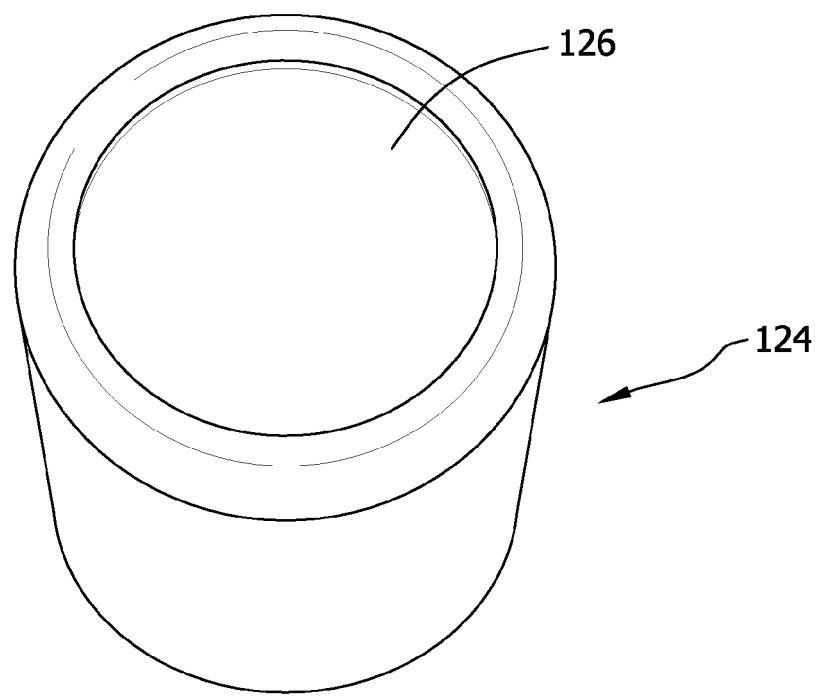
FIG. 14 is a perspective view of another example embodiment of a mold plug.
Figure 15:
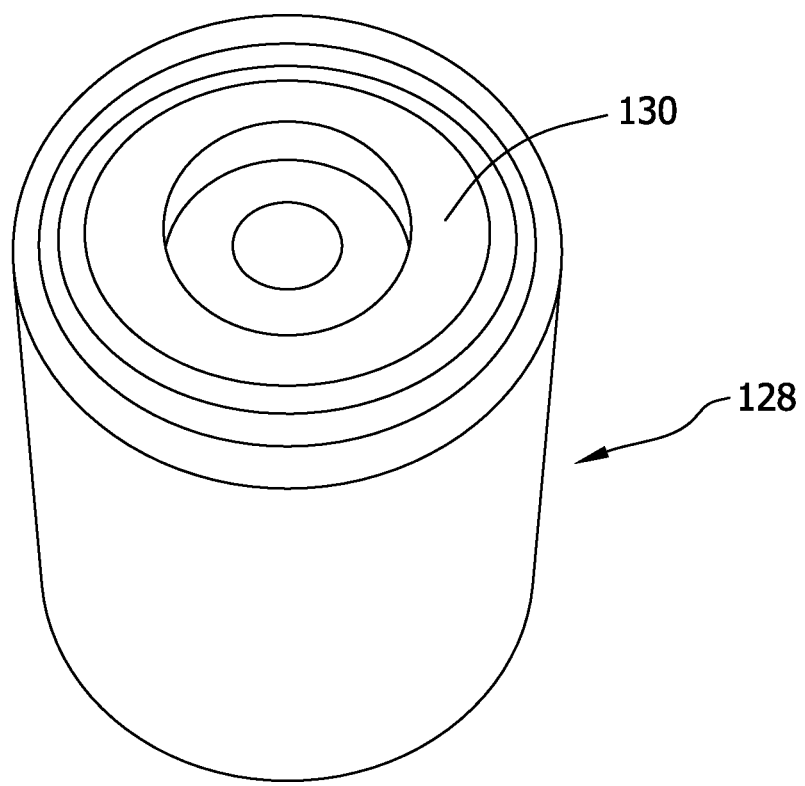
FIG. 15 is a perspective view of another example embodiment of a mold plug.
Figure 16:
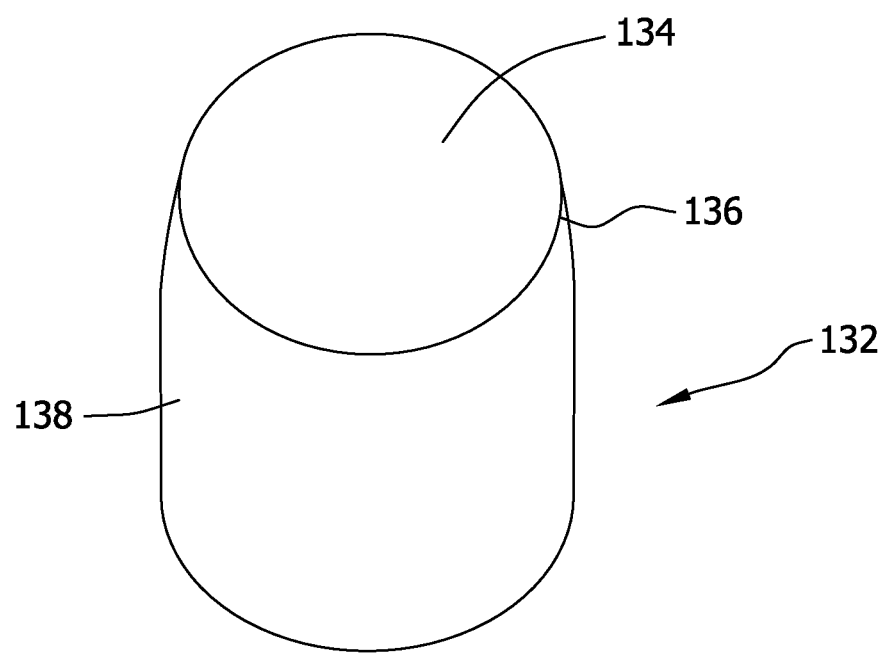
FIG. 16 is a perspective view of another example embodiment of a mold plug.
Figure 17:
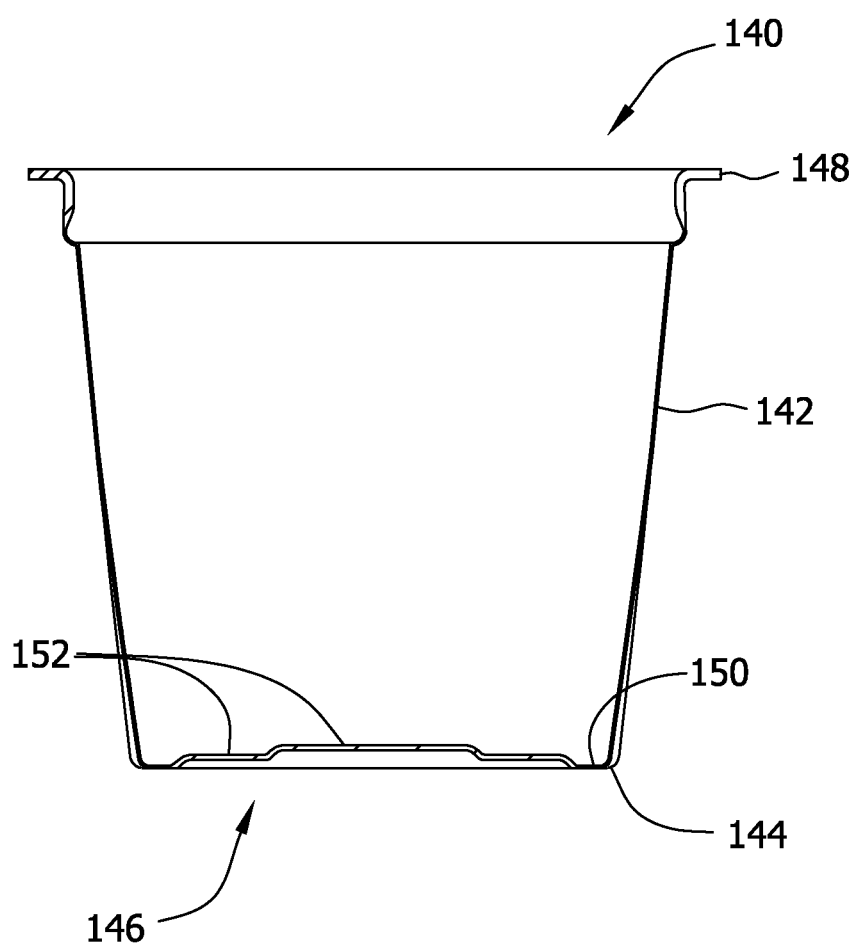
FIG. 17 is a side view of a cup formed from the forming insert shown in FIG. 5 and the forming base shown in FIG. 6.
Figure 18:
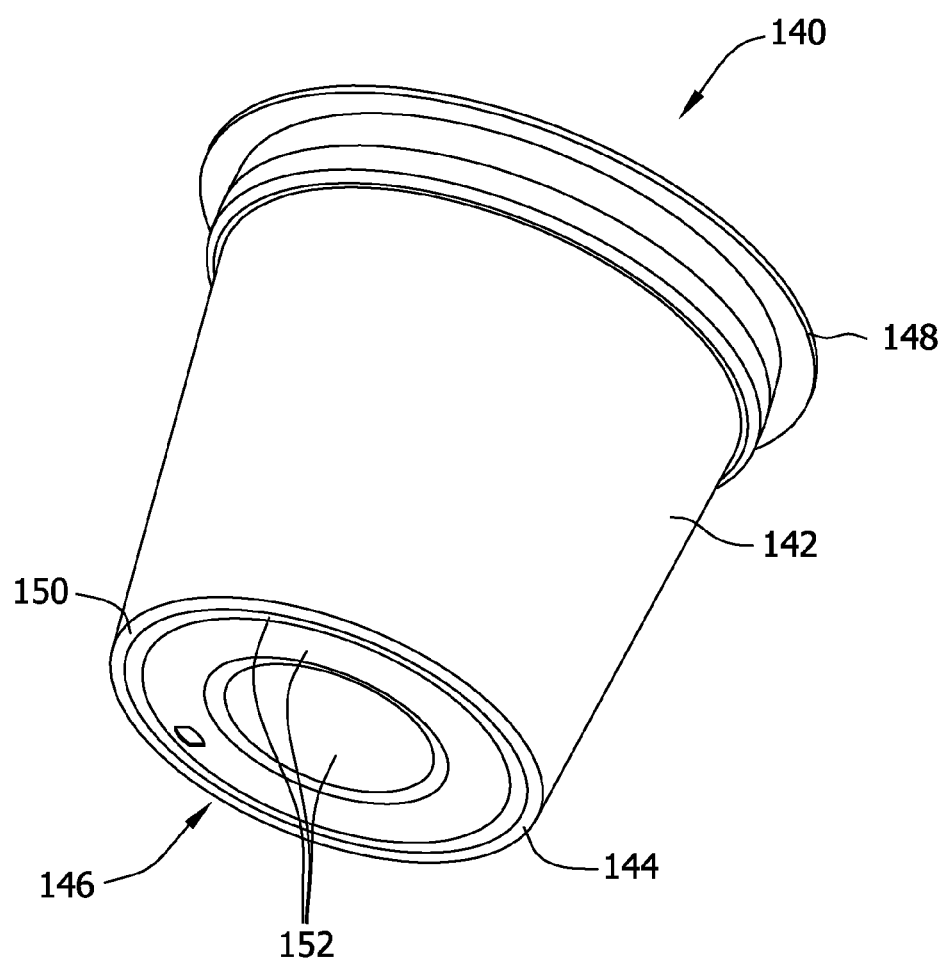
FIG. 18 is a perspective view of the cup shown in FIG. 17.

Mold 106 includes a forming insert 108 (shown in FIG. 11) and a forming base 110 (shown in FIG. 12). In the exemplary embodiment, forming insert 108 has a sidewall 109 that enables a cup to be molded within mold 106. More specifically, in the exemplary embodiment, a sidewall upper portion 111 defines a mold cavity 112 that is sized and/or shaped to provide the shape of a flange, a sidewall, and/or a heel of a cup being molded by mold 106. In the exemplary embodiment, the flange has a flange radius, the sidewall has a sidewall radius that is less than the flange radius, and the heel has a heel radius that is less than the sidewall radius.

For example, in the exemplary embodiment, the flange radius is between approximately 0.86 in. and 0.92 in., and the heel radius is between approximately 0.62 in. and 0.69 in. Moreover, in the exemplary embodiment, sidewall 73 extends between the heel and the flange at an angle that is approximately 5.81° from a vertical axis of the cup molded within mold 106. The flange, the sidewall, and/or the heel may have any suitable size and/or shape that enables mold 106 and/or the cup to function as described herein. Additionally, sidewall upper portion 111 includes a plurality of flutes 114 extending generally axially along a length of sidewall upper portion 111. In the exemplary embodiment, flutes 114 are disposed circumferentially about forming insert 108.

In the exemplary embodiment, a sidewall lower portion 115 defines a base cavity 116 that is sized and/or shaped to receive forming base 110. Forming base 110 includes a top surface 118 that is sized and/or shaped to provide the shape of a bottom and/or the heel of the cup being molded by mold 106. In the exemplary embodiment, top surface 118 includes a rim and at least one step 119 extending axially upward from the rim. In the exemplary embodiment, the rim and/or step 119 are substantially centrally aligned with respect to top surface 118. In the exemplary embodiment, the rim has a rim radius that is less than the heel radius, and step 119 has a step radius that is less than the rim radius. For example, in the exemplary embodiment, the rim radius is between approximately 0.37 in. and 0.63 in., and the step radius is between approximately 0.29 in. and 0.38 in. As such, the first step radius is approximately 60% of the rim radius. The rim and/or step 119 may have any suitable size and/or shape that enables mold 106 and/or the cup to function as described herein.

Mold 70, 82, 94, and/or 106 may be made from any suitable material, for example, steel, stainless steel, aluminum, and the like. In the exemplary embodiment, mold 70, 82, 94, and/or 106 includes a notch (not shown) that extends axially along lower portion 77. In the exemplary embodiment, the notch is shaped and/or sized to generally complement a groove 123 that extends axially along a sidewall of forming base 74, 86, 98, and/or 110, such that a position and/or orientation of forming base 74, 86, 98, and/or 110 is generally maintained with respect to lower portion 77 when the notch is engaged with groove 123. In the exemplary embodiment, the notch is generally configured to generally complement the groove.

In the exemplary embodiment, mold 70, 82, 94, and/or 106 include a plurality of openings 127 that extend through sidewall 121. Alternatively, openings 127 may extend through a sidewall that defines mold cavity 76, 88, 100, and/or 112. In the exemplary embodiment, openings 127 are in fluid communication with a vacuum system (not shown) such that air may be drawn out of cavity 76, 78, 88, 90, 100, 102, 112, and/or 116 through openings 127 using the vacuum system.

FIGS. 13-16 are bottom perspective schematic illustrations of plugs that may be used with molds 70, 82, 94, and/or 106. Plug 120, shown in FIG. 13, includes a smooth bottom 122. More specifically, in the exemplary embodiment, plug 120 has a generally smooth bottom surface 122 and a heel extending from bottom surface 122. In the exemplary embodiment, heel has a generally arcuate outer surface. Plug 124, shown in FIG. 14, includes raised and lower area of a bottom 126 to assist in forming the bottom of the cup being formed. More specifically, in the exemplary embodiment, plug 124 has a bottom surface 126, a rim, and a heel extending from the rim. In the exemplary embodiment, bottom surface 126 is depressed with respect to rim. Plug 128, shown in FIG. 15, includes raised and lower area of a bottom 130 to assist in forming the bottom of the cup being formed. More specifically, in the exemplary embodiment, plug 128 has a bottom surface 130 that defines a groove and a cavity that is generally concentrically aligned with the groove. Plug 132, shown in FIG. 16, has a generally smooth bottom surface 134, a heel 136 extending from bottom surface 134, and a sidewall 138 extending from heel 136. In the exemplary embodiment, sidewall 138 extends at an angle that is approximate 5.8° from a vertical axis of plug 132. In the exemplary embodiment, plug 132 facilitates distributing material towards bottom surface 134, heel 136, and a lower portion of sidewall 138 to enable an increased heel thickness to be formed.

Plugs 120, 124, 128, and/or 132 work synergistically with molds 70, 82, 94, and 106 to increase a thickness of at least a portion of the cup heel thickness. In the exemplary embodiment, plug 120, 124, 128, and/or 132 is selected to facilitate forming a cup with a desired sidewall thickness, heel thickness, and/or bottom thickness. More specifically, in the exemplary embodiment, plug 120, 124, 128, and/or 132 are configured to position a desired amount of multi-layered sheet structure 10 in at least one predetermined location to facilitate increasing a strength of the cup being formed by mold 70, 82, 94, and/or 106. Plugs 120, 124, 128, and/or 132 may be made from any suitable material, for example, steel, stainless steel, aluminum, polyether ether ketone (PEEK), and the like. In addition, plugs 120, 124, 128, and/or 132 may also include a plastic outer layer formed from, for example, an epoxy, a silicone, and the like.

During operation, in the exemplary embodiment, forming base 74, 86, 89, and/or 110 is positioned within base cavity 78, 90, 102, and/or 114. More specifically, the groove of forming base 74, 86, 89, and/or 110 is aligned with the notch of lower portion 77, 89, 101, and/or 113 such that forming base 74, 86, 89, and/or 110 is securely positioned within mold cavity 76, 88, 100, and/or 112. In the exemplary embodiment, multi-layered sheet structure 10 is extended across an opening defined by a top of mold 70, 82, 94, and/or 106, and heat is applied to multi-layered sheet structure 10 to facilitate softening multi-layer sheet structure 10. In the exemplary embodiment, plug 120, 124, 128, and/or 132 push the multi-layer sheet towards top surface 80, 92, 104, and/or 118 and/or upper portion 75, 87, 99, and/or 111, and air is drawn out of mold cavity 76, 88, 100, and/or 112 to facilitate pulling multi-layer sheet structure 10 towards top surface 80, 92, 104, and/or 118 and/or upper portion 75, 87, 99, and/or 111.

In the exemplary embodiment, use of multi-layer sheet structure 10 enables a cup formed from mold 70, 82, 94, and/or 106 to be substantially rigid while a liquid that is at least 150° F., a temperature for frothing milk, is disposed within the cup. More particularly, in the exemplary embodiment, multi-layer sheet structure 10 enables the cup to be substantially rigid while a liquid that is at least 190° F., a temperature for brewing coffee, is disposed within the cup. Even more particularly, in the exemplary embodiment, multi-layer sheet structure 10 enables the cup to be substantially rigid while a liquid that is at least 212° F., a temperature for boiling water, is disposed within the cup.

FIGS. 17-24 include a side schematic illustration and a bottom perspective schematic illustration of various cup designs formed from multi-layer 10. Cup 140, shown in FIGS. 17 and 18, includes a sidewall 142, a heel 144 extending from a bottom of sidewall 142, and a base 146 coupled to heel 144. Cup 140 may be formed in mold 70 shown in FIGS. 5 and 6. As such, in the exemplary embodiment, an outer surface of sidewall 142 is substantially complementary to upper portion 75, and an outer surface of base 146 is substantially complementary to top surface 80.

In the exemplary embodiment, cup 140 includes a flange 148 having an increased stack ledge depth as compared to at least some known cups. Moreover, in the exemplary embodiment, heel 144 has a reduced heel corner radius as compared to at least some known cups. In the exemplary embodiment, heel 144 is chamfered. Alternatively, heel 144 may have a generally arcuate outer surface. In the exemplary embodiment, base 146 includes a rim 150 and at least one step 152 disposed radially inward with respect to rim 150. More specifically, in the exemplary embodiment, a first step is disposed radially inward and extends axially upward from rim 150, and a second step is disposed radially inward and extends axially upward from the first step.

Figure 19:
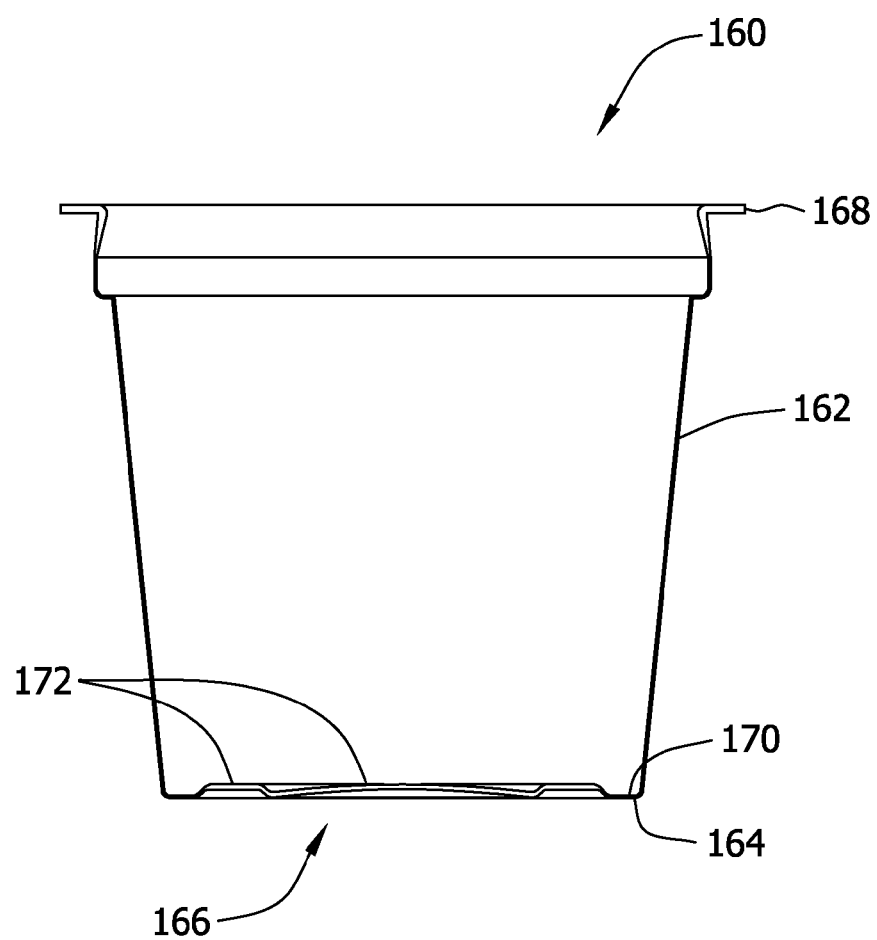
FIG. 19 is a side view of a cup formed from the forming insert shown in FIG. 7 and the forming base shown in FIG. 8.
Figure 20:
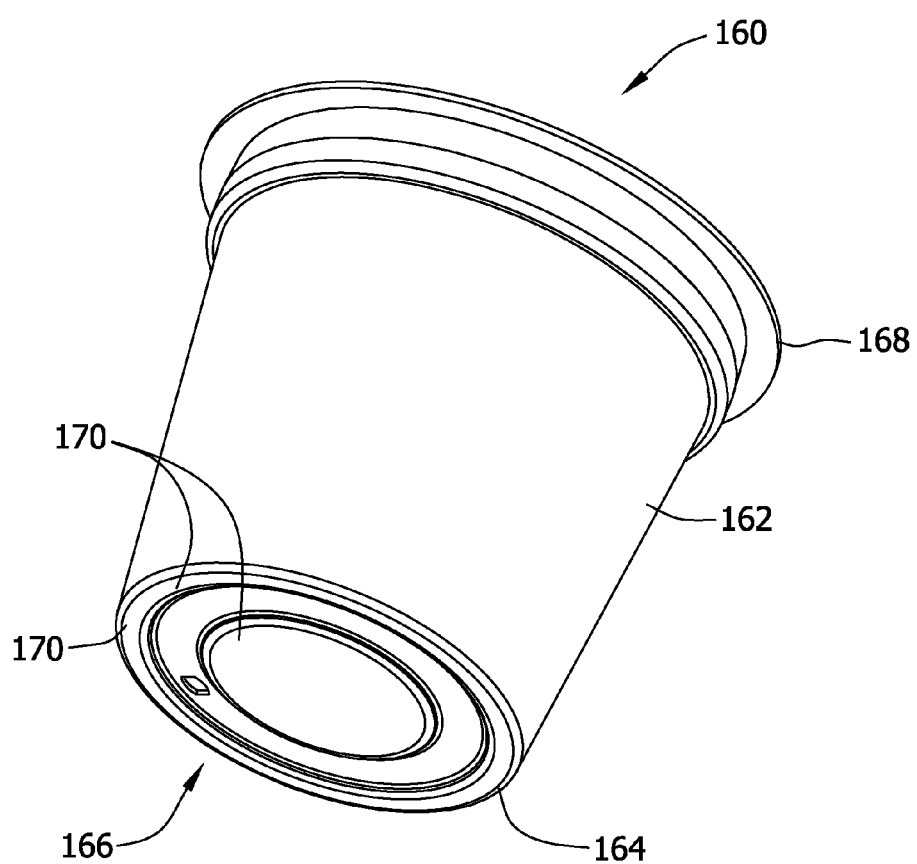
FIG. 20 is a perspective view of the cup shown in FIG. 19.

Cup 160, shown in FIGS. 19 and 20, includes a sidewall 162, a heel 164 extending from a bottom of sidewall 162, and a base 166 coupled to heel 164. Cup 160 may be formed in mold 82 shown in FIGS. 7 and 8. As such, in the exemplary embodiment, an outer surface of sidewall 162 is substantially complementary to upper portion 87, and an outer surface of base 166 is substantially complementary to top surface 92.

In the exemplary embodiment, cup 160 includes a flange 168 having an increased stack ledge depth as compared to at least some known cups. Moreover, in the exemplary embodiment, heel 164 has a reduced heel corner radius as compared to at least some known cups. In the exemplary embodiment, heel 164 is chamfered. Alternatively, heel 164 may have a generally arcuate outer surface. In the exemplary embodiment, base 166 includes a rim 170 and at least one step 172 disposed radially inward with respect to rim 170. More specifically, in the exemplary embodiment, a first step is disposed radially inward and extends axially upward from rim 170, and a second step is disposed radially inward and extends axially upward from the first step.

Figure 21:
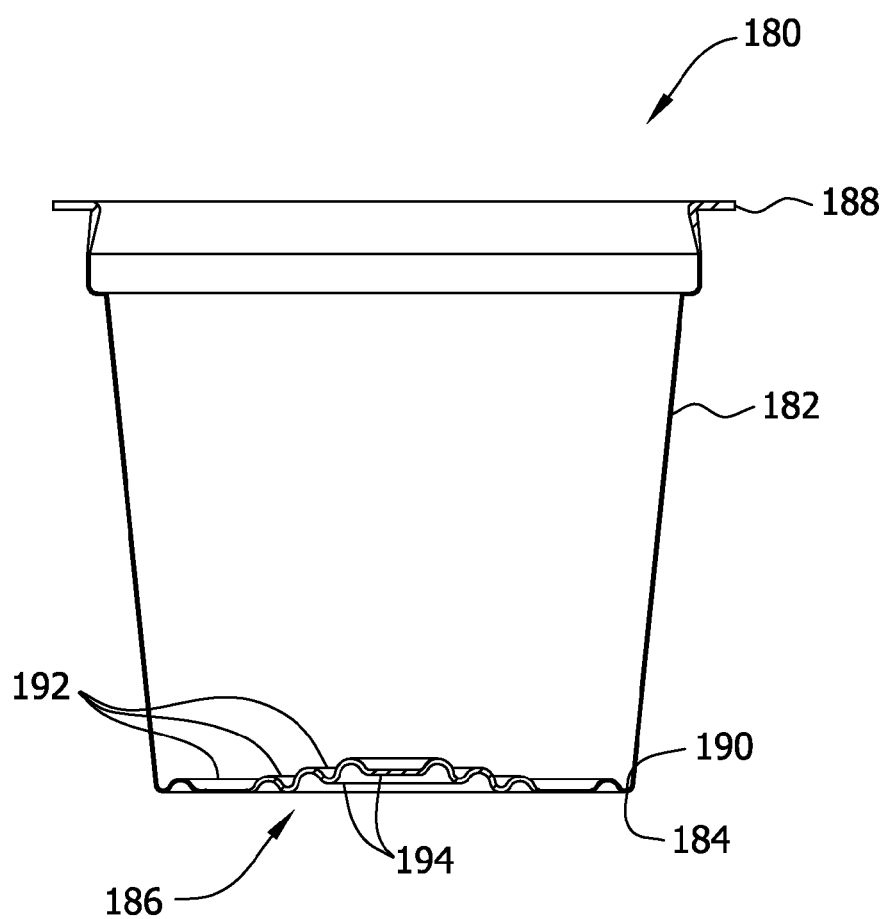
FIG. 21 is a side view of a cup formed from the forming insert shown in FIG. 9 and the forming base shown in FIG. 10.
Figure 22:
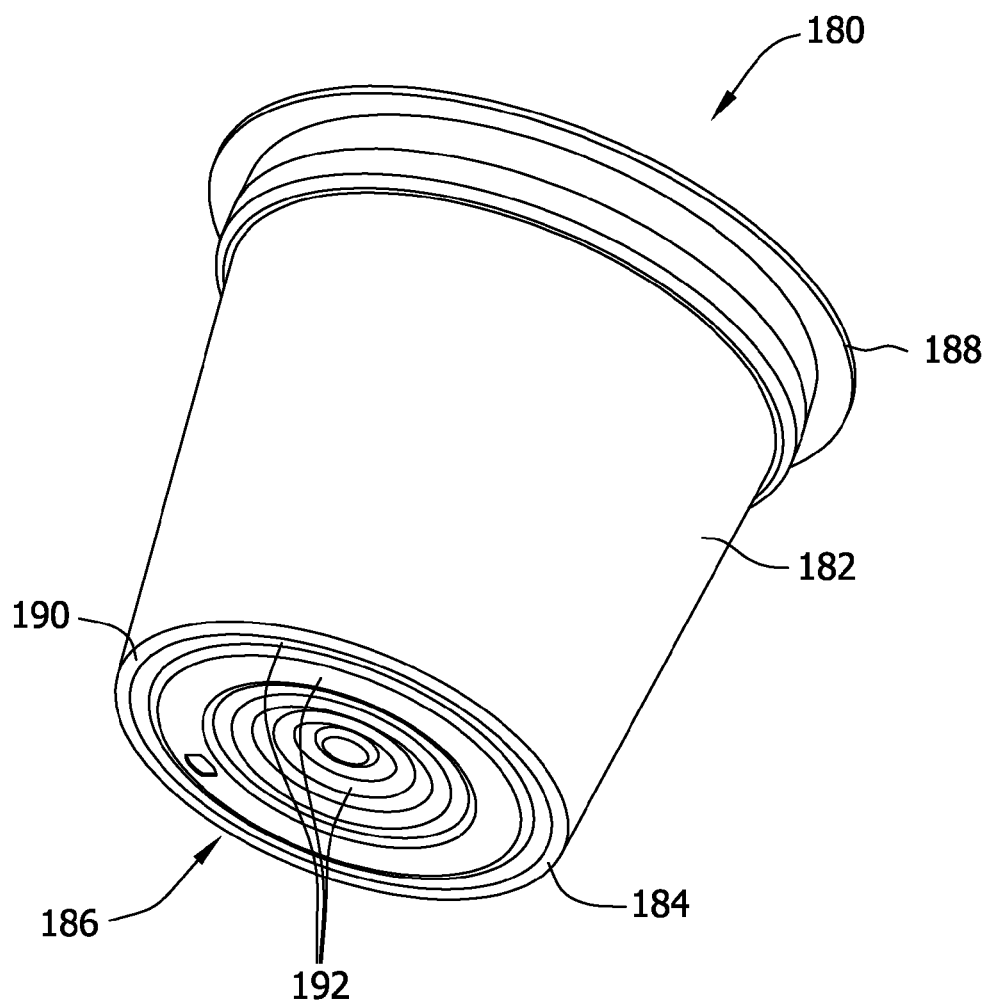
FIG. 22 is a perspective view of the cup shown in FIG. 21.

Cup 180, shown in FIGS. 21 and 22, includes a sidewall 182, a heel 184 extending from a bottom of sidewall 182, and a base 186 coupled to heel 184. Cup 180 may be formed in mold 94 shown in FIGS. 9 and 10. As such, in the exemplary embodiment, an outer surface of sidewall 182 is substantially complementary to upper portion 99, and an outer surface of base 186 is substantially complementary to top surface 104.

In the exemplary embodiment, cup 180 includes a flange 188 having an increased stack ledge depth as compared to at least some known cups. Moreover, in the exemplary embodiment, heel 184 has a reduced heel corner radius as compared to at least some known cups. In the exemplary embodiment, heel 184 is chamfered. Alternatively, heel 184 may have a generally arcuate outer surface. In the exemplary embodiment, base 186 includes a rim 190 and at least one rib 192 disposed radially inward with respect to rim 190. Moreover, in the exemplary embodiment, base 186 includes at least one step 194 disposed radially inward with respect to rim 190. More specifically, in the exemplary embodiment, a first step is disposed radially inward and extends axially upward from rim 190, and a second step is disposed radially inward and extends axially upward from the first step. As such, in the exemplary embodiment, ribs 192 are stepped such that ribs 192 increase in height and/or elevation with respect to heel 184 towards a center of base 186.

Figure 23:
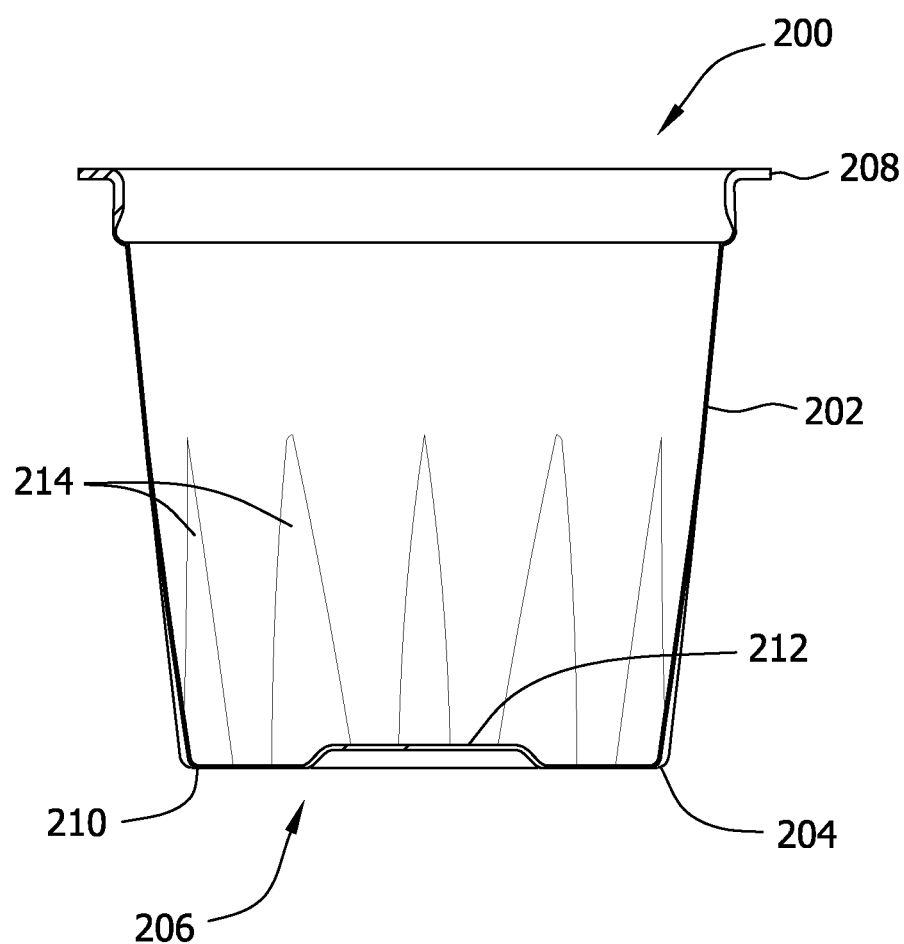
FIG. 23 is a side view of a cup formed from the forming insert shown in FIG. 11 and the forming base shown in FIG. 12.
Figure 24:
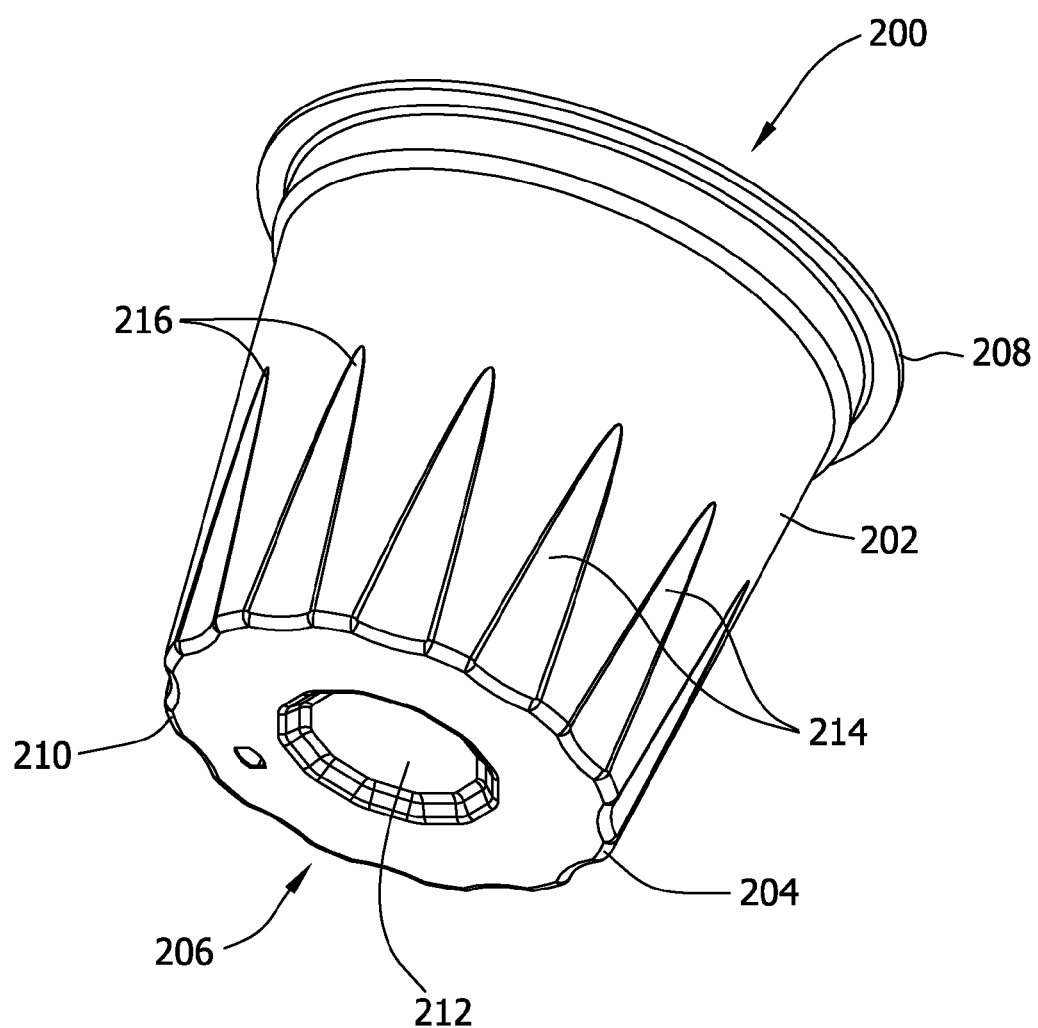
FIG. 24 is a perspective view of the cup shown in FIG. 23.

Cup 200, shown in FIGS. 23 and 24, includes a sidewall 202, a heel 204 extending from a bottom of sidewall 202, and a base 206 coupled to heel 204. Cup 200 may be formed in mold 106 shown in FIGS. 11 and 12. As such, in the exemplary embodiment, an outer surface of sidewall 202 is substantially complementary to upper portion 111, and an outer surface of base 206 is substantially complementary to top surface 118.

In the exemplary embodiment, cup 200 includes a flange 208 having an increased stack ledge depth as compared to at least some known cups. Moreover, in the exemplary embodiment, heel 204 has a reduced corner radius as compared to at least some known cups. In the exemplary embodiment, heel 204 is chamfered. Alternatively, heel 204 may have a generally arcuate outer surface. In the exemplary embodiment, base 206 includes a rim 210 and at least one step 212 disposed radially inward with respect to rim 210. More specifically, in the exemplary embodiment, step 212 is disposed radially inward and extends axially upward from rim 210.

Moreover, in the exemplary embodiment, cup 200 includes a plurality of flutes 214 extending axially from a bottom of sidewall 202 to provide strength to cup 200. More specifically, in the exemplary embodiment, flutes 214 extend between the bottom of sidewall 202 and a point 216 on sidewall 202 that is below flange 208. For example, in the exemplary embodiment, flutes 214 extend between approximately 20% and 80% of a height of sidewall 202. More particularly, in the exemplary embodiment, flutes 214 extend between approximately 40% and 60% of a height of sidewall 202. Alternatively, flutes 214 may extend any distance of sidewall 202 that enables cup 200 to function as described herein. In the exemplary embodiment, flutes 214 have a width that narrows as it approaches point 216. Alternatively, flutes 214 may have any size, shape, orientation, and/or configuration that enables cup 200 to function as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a puncturable container having a sidewall, a heel extending from a bottom of the sidewall, and a base coupled to the heel, said method comprising:
   positioning a forming base within a base cavity defined by a lower portion of a forming insert;
   the forming insert comprising an upper portion and a lower portion, said upper portion comprising a sidewall segment and a heel segment extending from a bottom of said sidewall segment, wherein said sidewall segment has a sidewall radius and said heel segment has a heel radius that is less than the sidewall radius;
   the forming base having a top surface that includes a rim and a step extending axially upward from the rim, wherein the rim has a rim radius that is less than the heel radius and the step has a step radius that is less than the rim radius;
   extending a multi-layer sheet structure across an opening defined by an upper portion of the forming insert, wherein the multi-layer sheet structure comprises a first layer comprising virgin polypropylene and a second layer comprising (i) virgin polypropylene, (ii) talc, and (iii) recycled material comprising unused ground-up multi-layer sheet structure; and
   drawing air out of a mold cavity to pull the multi-layer sheet structure towards at least one of the top surface and the upper portion; and
   pushing the multi-layer sheet structure with a plug into the mold cavity towards at least one of the top surface and the upper portion to form the puncturable container wherein a desired amount of the multi-layer sheet structure is distributed to at least one of the sidewall, the heel, and the base such that the puncturable container withstands being punctured without being crushed.

2. A method in accordance with claim 1 further comprising applying heat to the multi-layer sheet structure to facilitate softening the multi-layer sheet structure.

3. A method in accordance with claim 1, the plug having a generally smooth bottom surface and a heel extending from the bottom surface.

4. A method in accordance with claim 1, the plug having a bottom surface, a rim, and a heel extending from the rim, wherein the bottom surface is depressed with respect to the rim.

5. A method in accordance with claim 1, the plug having a bottom surface that defines a groove and a cavity that is substantially concentrically aligned with the groove.

6. A method in accordance with claim 1 further comprising aligning a notch of the forming insert with a groove of the forming base, wherein the notch extends axially along the lower portion, and the groove extends axially along a sidewall of the forming base.

7. A method in accordance with claim 1 further comprising the step of removing the puncturable container from the mold cavity.

8. A method in accordance with claim 7 further comprising the step of providing the puncturable container for use in a coffee brewing machine.

9. A method in accordance with claim 8, wherein the amount of the multi-layer sheet structure is distributed such that the puncturable container permits a clean puncture in the base of the puncturable container by the coffee brewing machine.

10. A method in accordance with claim 1, wherein the amount of the multi-layer sheet structure is distributed such that a thickness of at least a portion of the heel is increased.

11. A method in accordance with claim 1, wherein the multilayer sheet structure further comprises a color concentrate.

12. A method of forming a puncturable container for use in a coffee brewing machine, said puncturable container having a sidewall, a heel extending from a bottom of the sidewall, and a base coupled to the heel, said method comprising:
    positioning a forming base within a base cavity defined by a lower portion of a forming insert;
    the forming insert comprising an upper portion and a lower portion, said upper portion comprising a sidewall segment and a heel segment extending from a bottom of said sidewall segment, wherein said sidewall segment has a sidewall radius and said heel segment has a heel radius that is less than the sidewall radius;
    the forming base having a top surface that includes a rim and a step extending axially upward from the rim, wherein the rim has a rim radius that is less than the heel radius and the step has a step radius that is less than the rim radius;
    applying heat to a multi-layer sheet structure to facilitate softening the multi-layer sheet structure, wherein the multi-layer sheet structure comprises a first layer comprising virgin polypropylene and a second layer comprising (i) virgin polypropylene, (ii) talc, and (iii) recycled material comprising unused ground-up multi-layer sheet structure;
    extending the multi-layer sheet structure across an opening defined by an upper portion of the forming insert;
    pushing the multi-layer sheet structure with a plug into a mold cavity towards at least one of the top surface and the upper portion to form the puncturable container wherein a desired amount of the multi-layer sheet structure is distributed to at least one of the sidewall, the heel, and the base such that the puncturable container withstands being punctured by the coffee brewing machine without being crushed;
    removing the puncturable container from the mold cavity; and
    providing the puncturable container for use in the coffee brewing machine.

13. A method in accordance with claim 12, wherein the amount of the multi-layer sheet structure is distributed such that the puncturable container permits a clean puncture in the base of the puncturable container by the coffee brewing machine.

14. A method in accordance with claim 12, wherein the amount of the multi-layer sheet structure is distributed such that a thickness of at least a portion of the heel is increased.

15. A method in accordance with claim 12, wherein the multilayer sheet structure further comprises a color concentrate.

16. A method in accordance with claim 12, the plug having a generally smooth bottom surface and a heel extending from the bottom surface.

17. A method in accordance with claim 12, the plug having a bottom surface, a rim, and a heel extending from the rim, wherein the bottom surface is depressed with respect to the rim.

18. A method in accordance with claim 12, the plug having a bottom surface that defines a groove and a cavity that is substantially concentrically aligned with the groove.

19. A method in accordance with claim 12 further comprising aligning a notch of the forming insert with a groove of the forming base, wherein the notch extends axially along the lower portion, and the groove extends axially along a sidewall of the forming base.

20. A method of forming a puncturable container having a sidewall, a heel extending from a bottom of the sidewall, and a base coupled to the heel, said method comprising:
    positioning a forming base within a base cavity defined by a lower portion of a forming insert;
    the forming insert comprising an upper portion and a lower portion, said upper portion comprising a sidewall segment and a heel segment extending from a bottom of said sidewall segment, wherein said sidewall segment has a sidewall radius and said heel segment has a heel radius that is less than the sidewall radius;
    the forming base having a top surface that includes a rim and a step extending axially upward from the rim, wherein the rim has a rim radius that is less than the heel radius and the step has a step radius that is less than the rim radius;
    extending a multi-layer sheet structure across an opening defined by an upper portion of the forming insert; and
    pushing the multi-layer sheet structure with a plug into the mold cavity towards at least one of the top surface and the upper portion to form the puncturable container wherein the puncturable container withstands being punctured without being crushed;
    wherein the multi-layer sheet structure comprises:
        (a) an outer top layer comprising a first polypropylene composition;
        (b) an inner top layer comprising a second polypropylene composition;
        (c) an inner bottom layer comprising a third polypropylene composition; and
        (d) an outer bottom layer comprising a fourth polypropylene composition;
    wherein the first and fourth polypropylene compositions each comprises virgin polypropylene; and
    wherein the second and third polypropylene compositions each comprises (i) virgin polypropylene, (ii) talc, and (iii) recycled material comprising unused ground-up multi-layer sheet structure.

21. A method in accordance with claim 20, wherein an amount of the multi-layer sheet structure is distributed such that a thickness of at least a portion of the heel is increased.

* * * * *